US012699892B2

(12) United States Patent
Ko et al.

(10) Patent No.: US 12,699,892 B2
(45) Date of Patent: Aug. 4, 2026

(54) NEURAL NETWORK METHOD AND APPARATUS

(71) Applicants: Samsung Electronics Co., Ltd., Suwon-si (KR); CAMBRIDGE ENTERPRISE LIMITED, Cambridge (GB)

(72) Inventors: Yousun Ko, Cambridge (GB); Alex Chadwick, Cambridge (GB); Robert Mullins, Cambridge (GB); Daniel Bates, Cambridge (GB)

(73) Assignees: Samsung Electronics Co., Ltd., Suwon-si (KR); CAMBRIDGE ENTERPRISE LIMITED, Cambridge (GB)

( * ) Notice: Subject to any disclaimer, the term of this patent is extended or adjusted under 35 U.S.C. 154(b) by 1071 days.

(21) Appl. No.: 17/088,771

(22) Filed: Nov. 4, 2020

(65) Prior Publication Data

US 2021/0133570 A1    May 6, 2021

Related U.S. Application Data

(60) Provisional application No. 62/930,029, filed on Nov. 4, 2019.

(30) Foreign Application Priority Data

Oct. 20, 2020    (KR) ........................ 10-2020-0136124

(51) Int. Cl.
$G06N\ 3/08$        (2023.01)
$G06N\ 3/04$        (2023.01)

(52) U.S. Cl.
CPC ................. *G06N 3/08* (2013.01); *G06N 3/04* (2013.01)

(58) Field of Classification Search
CPC ............... G06N 3/00; G06N 3/08; G06N 3/04
See application file for complete search history.

(56) References Cited

U.S. PATENT DOCUMENTS 6,744,388 B1 *   6/2004   Khu ................... H03M 7/3086
                                                                341/51
10,827,039 B1 *   11/2020   Dandekar ............... H04L 69/04
(Continued)

FOREIGN PATENT DOCUMENTS

CN        107341113 A   *  11/2017   ......... G06F 12/0893
CN        109102064 A       12/2018
WO   WO-2019185987 A1 *  10/2019

OTHER PUBLICATIONS

Cristian Perra, et al. (2015). Lossless Plenoptic Image Compression Using Adaptive Block Differential Prediction. (Year: 2015).*
(Continued)

*Primary Examiner* — Li B. Zhen
*Assistant Examiner* — Sadik A Alshahari
(74) *Attorney, Agent, or Firm* — NSIP Law

(57) ABSTRACT

A method and apparatus for processing data of a neural network. The method includes: obtaining one or more bit representations of data used for processing a neural network; generating a plurality of candidate profiles based on the bit representations; determining a final profile by comparing compression performances for each of the candidate profiles; and determining an optimal configuration for compressing data of the neural network based on the determined final profile.

18 Claims, 28 Drawing Sheets

(56)                References Cited

U.S. PATENT DOCUMENTS

| | | | | |
|---|---|---|---|---|
| 11,537,853 | B1* | 12/2022 | Afzal | G06F 5/01 |
| 2005/0249420 | A1* | 11/2005 | Takahashi | H04N 1/6058 |
| | | | | 382/232 |
| 2010/0054618 | A1* | 3/2010 | Kawazoe | H04N 19/17 |
| | | | | 382/239 |
| 2013/0173564 | A1* | 7/2013 | Roberts | H03M 7/3088 |
| | | | | 707/693 |
| 2014/0101485 | A1* | 4/2014 | Wegener | H03M 7/3079 |
| | | | | 714/E11.178 |
| 2017/0200069 | A1* | 7/2017 | Matsumoto | H04N 1/417 |
| 2018/0011869 | A1* | 1/2018 | Senthil | H03M 7/40 |
| 2018/0026656 | A1* | 1/2018 | Gopal | H04L 43/0894 |
| | | | | 341/51 |
| 2018/0102788 | A1* | 4/2018 | Inoue | H03M 7/607 |
| 2018/0138921 | A1* | 5/2018 | Arelakis | H03M 7/3071 |
| 2018/0239992 | A1* | 8/2018 | Chalfin | G06V 10/50 |
| 2018/0287630 | A1* | 10/2018 | Gopal | H03M 7/6011 |
| 2018/0299841 | A1 | 10/2018 | Appu et al. | |
| 2018/0373808 | A1* | 12/2018 | Gopal | G06F 16/221 |
| 2019/0066257 | A1* | 2/2019 | Daga | G06T 9/002 |
| 2019/0068981 | A1* | 2/2019 | Chong | H04N 19/184 |
| 2019/0081637 | A1* | 3/2019 | Pool | G06F 12/0866 |
| 2019/0140657 | A1* | 5/2019 | Suzuki | H03M 7/3077 |
| 2019/0190538 | A1* | 6/2019 | Park | G06N 3/063 |
| 2019/0228284 | A1* | 7/2019 | Holland | G06N 3/047 |
| 2019/0245918 | A1* | 8/2019 | Xu | H04L 63/0869 |
| 2019/0251418 | A1 | 8/2019 | Nakanishi et al. | |
| 2019/0304053 | A1 | 10/2019 | Ould-Ahmed-Vall et al. | |
| 2019/0392300 | A1* | 12/2019 | Weber | G06N 3/04 |
| 2020/0125668 | A1* | 4/2020 | Psaroudakis | G06F 9/45558 |
| 2020/0274552 | A1* | 8/2020 | Rigo | H03M 7/6088 |

OTHER PUBLICATIONS

Han-Yi Lin, et al. (2015). HLC: Software-Based Half-Level-Cell Flash Memory. (Year: 2015).*

NPL: Asraf et al., "Statistical Analysis of Difference image for Absolutely Lossless Compression of Medical Images." (2006). (Year: 2006).*

Jin, Sian, et al., "DeepSZ: A Novel Framework to Compress Deep Neural Networks by Using Error-Bounded Lossy Compression", Proceedings of the 28th International Symposium on High-Performance Parallel and Distributed Computing, Apr. 23, 2019.

Extended European Search Report issued on Apr. 6, 2021 in counterpart EP Patent Application No. 20205334.4.

Chinese Office Action issued on Dec. 15, 2025, in counterpart Chinese Patent Application No. 202011214414.6 (13 pages in English, 11 pages in Chinese).

* cited by examiner

Sparsity : 22.61%

FREQUENCY (%)

20

15

10

5

0

0 0000 0000
0 0001 0000
0 0010 0000
0 0100 0000
0 1000 0000
1 0000 0000

BIT REPRESENTAION $lane_0 = b_1 b_2 b_3 b_4 b_5 b_6 b_7 b_8 b_9$ 1 1111 1111

FIG. 8

---

Algorithm 1: Lane−wise profiling

---

Input: data $x$, bit−width of a value $u$, a set of lane methods $M$,
       a set of algorithmic parameters $P_m$ for $m \in M$      $\Big\}$ 81 begin $S_{lane} \leftarrow \emptyset$, $R \leftarrow \emptyset$ for $l_{width} = 1, 2, \ldots, b$ do for $l_{pos} = 0, 1, \ldots, b - l_{width}$ do      $\Big\}$ 82

$S_{lane} \leftarrow S_{lane} \cup \{(l_{width}, l_{pos})\}$ for $all$ $l \in S_{lane}$ do $x_l \leftarrow$ split_bits$(x, l)$ for $all$ $m \in M$ do      $\Big\}$ 83 for $all$ $p \in P_m$ do $R \leftarrow R \cup \{((l, m, p), \textbf{profile}(l, m, p, x_l))\}$ Output : result of profiling $R$  $\Big\}$ 84

---

Algorithm 2: Configuration selection

---

Input: result of profiling $R$, bit–width of a value $w$, a set of lane
methods $M$, a set of symbol–based lane methods $M_{sym} \subset M$,
a set of algorithmic parameters $P_m$ for $m \in M$, the maximum
number of lanes allowed in HW design $C_{lane}$, the maximum
number of NS logic allowed in HW design $C_{NS}$       } 91 begin $\quad$ $S_{split} \leftarrow \emptyset$, $B \leftarrow \{1, \ldots, b\}$ $\quad$ for $l_{num} = 1, \ldots, b$ do $\quad\quad$ for all $c \in \mathbf{combination}(B, l_{num}-1)$ do $\quad\quad\quad$ $L \leftarrow \emptyset$, $l_{pos} \leftarrow 0$ $\quad\quad\quad$ for $i = 0, \ldots, |c| - 1$ do $\quad\quad\quad\quad$ $L \leftarrow L \cup \{(c_i - l_{pos}, l_{pos})\}$, $l_{pos} \leftarrow c_i$ $\quad\quad\quad$ $L \leftarrow L \cup \{(b - l_{pos}, l_{pos})\}$ $\quad\quad\quad$ $S_{split} \leftarrow S_{split} \cup \{L\}$       } 92

$\quad$ $K \leftarrow \emptyset$, $c \leftarrow \inf$, $P \leftarrow \mathbf{U}_{m \in M}(m, P_m)$ $\quad$ for all $L \in S_{split}$ do $\quad\quad$ if $|L| > C_{lane}$ then $\quad\quad\quad$ continue $\quad\quad$ $X \leftarrow \emptyset$ $\quad\quad$ for all $l \in L$ do $\quad\quad\quad$ $X \leftarrow X \cup \{(l, \mathbf{pickBestMP}(R, l, M, P))\}$ $\quad\quad$ if $\mathbf{countNSMethods}(X) > C_{NS}$ then $\quad\quad\quad$ continue $\quad\quad$ else if $\mathbf{countSymBasedMethods}(X) = 0$ then $\quad\quad\quad$ $Y \leftarrow \emptyset$ $\quad\quad\quad$ for all $l \in L$ do $\quad\quad\quad\quad$ $(m, p) \leftarrow \mathbf{pickBestMP}(R, l, M_{sym}, P))\}$ $\quad\quad\quad\quad$ $Y \leftarrow Y \cup \{X - X_l + \{(l, (m, p))\}\}$ $\quad\quad\quad$ for all $Z \in Y$ do $\quad\quad\quad\quad$ if $\Sigma_{l \in L} R_{Z_l} = \min_{I \in Y} \Sigma_{l \in L} R_{I_l}$ then $\quad\quad\quad\quad\quad$ $X \leftarrow Z$       } 93

$\quad\quad$ if $c > \Sigma_{l \in L} R_{X_l}$ then $\quad\quad\quad$ $K \leftarrow X$ $\quad\quad\quad$ $c \leftarrow \Sigma_{l \in L} R_{X_l}$ Output : configuration $K$    } 94

---

Algorithm 3: pickBestMP($R$, $l$, $M$, $P$)

--- begin for *all* $m \in M$ do for *all* $p \in P_m$ do if $R_{(l, m, p)} = \min_{i \in M, j \in P_i} R_{(l, i, j)}$ then $m_{best} \leftarrow m$, $p_{best} \leftarrow p$ return $(m_{best}, p_{best})$

}⟩ 100

---

| METHOD | ALGORITHMIC PARAMETER | RANGE |
|---|---|---|
| None | None | N/A |
| ZVC | None | N/A |
| RLC | Max seq. ($2^p$) | $1 \leq p \leq 32$ |
| Z–RLC | Max seq. ($2^p$) | $1 \leq p \leq 32$ |
| D–DPRed | Block size ($p$) | $1 \leq p \leq 8$ |
| S–DPRed | Block size ($p$) | $1 \leq p \leq 8$ |

Figure 14:
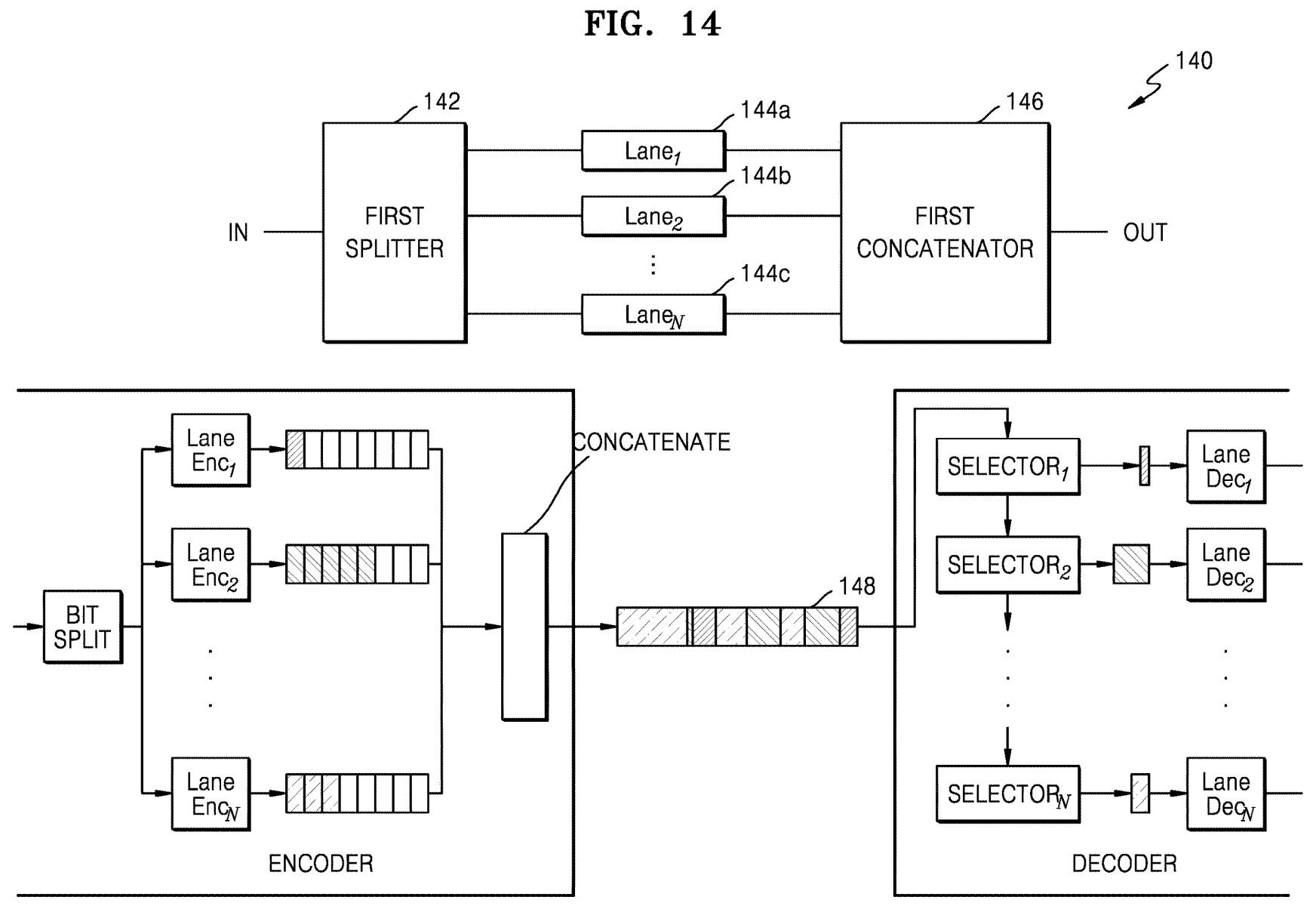

FIRST
SPLITTER

Lane₁   144a
Lane₂   144b
⋮
Lane_N   144c

146

FIRST
CONCATENATOR

OUT

ENCODER

BIT
SPLIT

Lane
Enc₁
Lane
Enc₂
⋯
Lane
Enc_N

CONCATENATE

148

DECODER

SELECTOR₁
SELECTOR₂
→ ⋯ →
SELECTOR_N

Lane
Dec₁
Lane
Dec₂
⋯
Lane
Dec_N

```
while True:
    for l in Lanes:
        if l.need_stop_code:
            output ('10..0', '0', l. index)        } 151
        b += l.output_symbol
    output (b[0:C])
    if (b[0:C]) == '10..0' :
        output ('1')                               } 152
    output (b[C:])
```

FIG. 16

| Processing Order | 160<br>0 | 161<br>1 | 162<br>2 | 163<br>3 | 164<br>4 | 165<br>5 | 166<br>6 |
|---|---|---|---|---|---|---|---|
| Input | 00000 | 00001 | 00010 | 00011 | 00000 | 00100 | 01000 |
| Lane 1 in | 00 | 01 | 10 | 11 | 00 | 00 | 00 |
| Lane 2 in | 000 | 000 | 000 | 000 | 000 | 001 | 010 |
| Stop code | | | | | | 10 | |
| Lane 1 out | 0 | 101 | 110 | 111 | 0 | 0 | 0 |
| Lane 2 out | 00011 | | | | | 001 | 010 |
| Concatenation | 000011 | 101 | 110 | 111 | 0 | 100001 | 0010 |
| Output | 000011 | 1011 | 110 | 111 | 0 | 1000001 | 0010 |

Stop code: 10

Methods: Lane 1: ZVC

Lane 2: Z–RLC, Max seq. $=2^2$

| Network | Inf./ Re-tr. | Data Source | Data type | Value sparsity | Bit sparsity | Top-1 model acc. |
|---|---|---|---|---|---|---|
| LeNet-5 | Inf. | Acts Weights | 10 FxP 8 FxP | 11.45% 3.23% | 76.75% 64.32% | 98.97% (−0.08%) |
| | Re-tr. | Acts Weights Grads | 14 FxP 14 FxP 14 FxP | 0.59% 52.77% 34.15% | 62.71% 83.28% 88.76% | 99.20% (+0.15%) |
| CifarNet | Inf. | Acts Weights | 10 FxP 10 FxP | 66.17% 2.35% | 91.43% 66.28% | 92.92% (−0.08%) |
| | Re-tr. | Acts Weights Grads | 10 FxP 18 FxP 14 FxP | 28.55% 30.56% 66.87% | 76.85% 74.84% 93.95% | 92.85% (−0.15%) |
| ResNet-18 | Inf. | Acts Weights | 12 FxP 12 FxP | 33.76% 0.94% | 77.83% 66.95% | 69.21% (−0.03%) |
| | Re-tr. | Acts Weights Grads | 22 FxP 24 FxP 22 FxP | 13.00% 0.07% 36.77% | 64.81% 61.20% 81.62% | 69.30% (+0.06%) |
| SqueezeNet | Inf. | Acts Weights | 12 FxP 12 FxP | 47.57% 6.30% | 82.99% 68.76% | 52.26% (−0.14%) |
| | Re-tr. | Acts Weights Grads | 26 FxP 26 FxP 26 FxP | 19.14% 6.50% 39.16% | 65.61% 61.08% 81.69% | 52.11% (−0.29%) |
| MobileNet | Inf. | Acts Weights | 14 FxP 14 FxP | 56.14% 33.84% | 84.63% 76.78% | 68.09% (−0.07%) |
| | Re-tr. | Acts Weights Grads | 24 FxP 24 FxP 24 FxP | 42.69% 36.65% 42.71% | 76.60% 75.10% 81.51% | 68.21% (+0.06%) |
| AlexNet | Inf. | Acts Weights | 12 FxP 12 FxP | 57.02% 9.41% | 88.11% 67.51% | 58.60% (−0.08%) |
| | Re-tr. | Acts Weights Grads | 22 FxP 24 FxP 22 FxP | 24.91% 8.86% 51.41% | 70.40% 62.33% 87.08% | 58.94% (+0.25%) |
| LSTM | Inf. | Acts Weights | 12 FxP 12 FxP | 1.84% 12.64% | 70.19% 82.07% | 21.47% (−0.02%) |
| | Re-tr. | Acts Weights Grads | 22 FxP 22 FxP 20 FxP | 0.56% 1.32% 19.12% | 62.46% 69.40% 92.83% | 21.49% (+0.00%) |

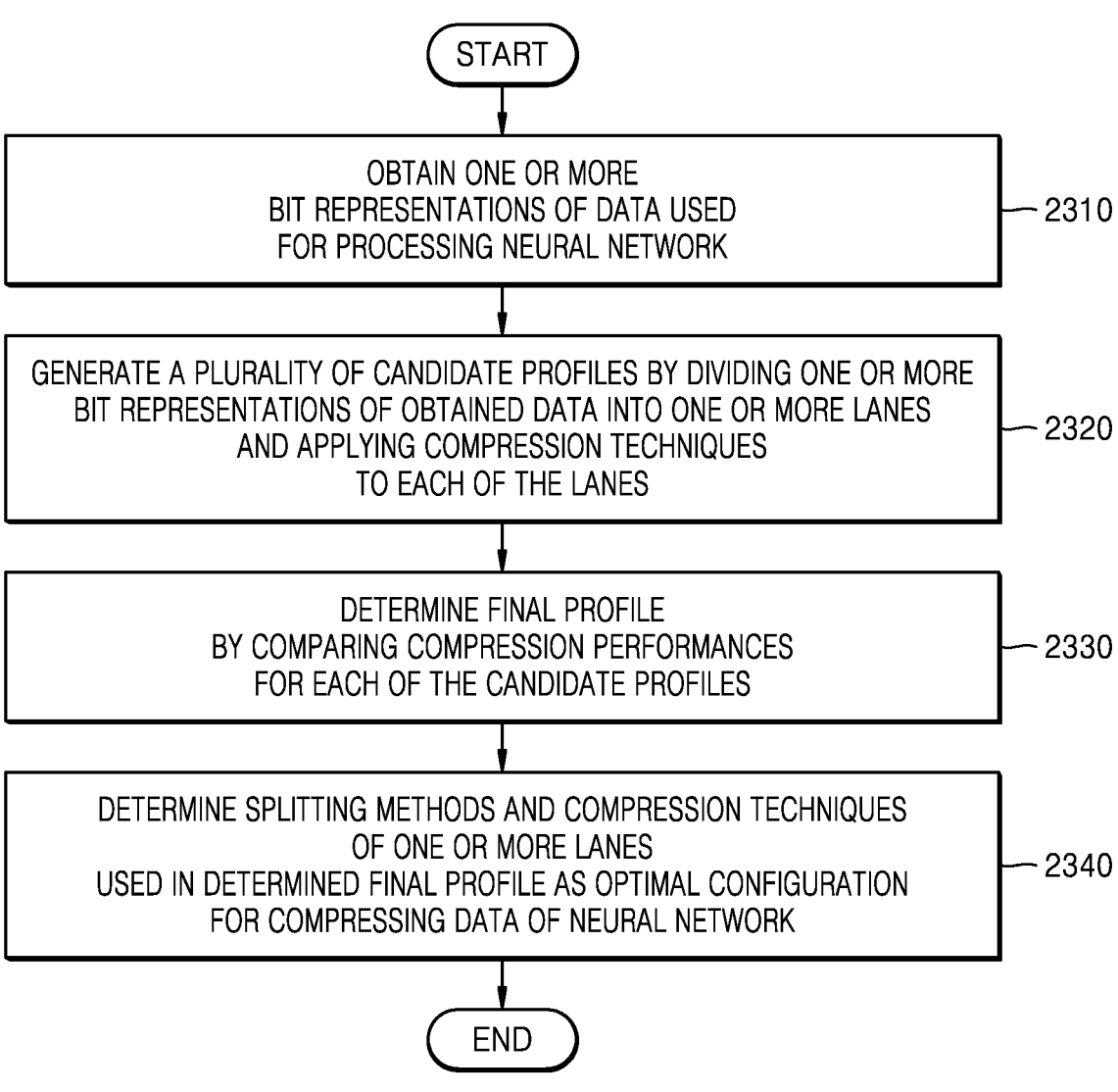

START

OBTAIN ONE OR MORE
BIT REPRESENTATIONS OF DATA USED
FOR PROCESSING NEURAL NETWORK — 2310

GENERATE A PLURALITY OF CANDIDATE PROFILES BY DIVIDING ONE OR MORE
BIT REPRESENTATIONS OF OBTAINED DATA INTO ONE OR MORE LANES
AND APPLYING COMPRESSION TECHNIQUES
TO EACH OF THE LANES — 2320

DETERMINE FINAL PROFILE
BY COMPARING COMPRESSION PERFORMANCES
FOR EACH OF THE CANDIDATE PROFILES — 2330

DETERMINE SPLITTING METHODS AND COMPRESSION TECHNIQUES
OF ONE OR MORE LANES
USED IN DETERMINED FINAL PROFILE AS OPTIMAL CONFIGURATION
FOR COMPRESSING DATA OF NEURAL NETWORK — 2340

END

NEURAL NETWORK METHOD AND APPARATUS

CROSS-REFERENCE TO RELATED APPLICATION

This application claims the benefit of U.S. Provisional Application No. 62/930,029, filed on Nov. 4, 2019 in the United States Patent and Trademark Office and Korean Patent Application No. 10-2020-0136124, filed on Oct. 20, 2020, in the Korean Intellectual Property Office, the entire disclosures of which are incorporated herein by reference for all purposes.

BACKGROUND

1. Field

The present disclosure relates to neural network methods and apparatuses.

2. Description of Related Art

A neural network refers to a computational architecture that models the biological brain. With the development of neural network technology, various kinds of electronic systems have been actively studied for analyzing input data and extracting valid information using a neural network device. Apparatuses for processing a neural network require a large amount of data transmission and computation with respect to complex input data. Accordingly, in order to extract desired information by analyzing a large amount of input data in real time using a neural network, a technology capable of efficiently processing a data flow related to a neural network is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of processing data of a neural network includes: obtaining one or more bit representations of data; generating a plurality of candidate profiles by dividing the one or more bit representations into one or more lanes, respectively, and applying compression techniques to each of the lanes; determining a final profile by comparing compression performances for each of the candidate profiles; and determining splitting methods and compression techniques of one or more lanes used in the final profile as an optimal configuration for compressing data of the neural network.

Generating the plurality of candidate profiles may include generating the candidate profiles by differently applying at least one of the splitting methods for splitting the bit representations into the one or more lanes and the compression techniques.

The candidate profiles may include profiles to which splitting methods, in which the number of lanes for dividing the bit representations into a plurality of bit segments and bit widths of the bit segments corresponding to each of the lanes are differently set from each other, are applied.

The candidate profiles may include profiles having sparsity distributions of the lanes different from each other according to the number and bit width of the lanes.

The candidate profiles may include profiles to which compression techniques different from each other are applied for each of the lanes.

The candidate profiles may include profiles to which compression techniques having algorithmic parameters different from each other are applied.

Determining the final profile may include: calculating compression rates corresponding to each of the candidate profiles for the bit representations of the data; and determining a candidate profile having the greatest compression rate among the calculated compression rates as the final profile.

The data of the neural network may include at least one of activations, weights, and gradients of the neural network.

The candidate profiles may include a profile to which a compression technique that does not compress a lane including the least significant bit (LSB) among the lanes is applied.

In another general aspect, an apparatus for processing data of a neural network includes: a memory configured to store at least one program; and a processor configured to compress the data by executing the at least one program, wherein the processor obtains one or more bit representations of data used for processing the neural network, generates a plurality of candidate profiles by dividing the one or more bit representations into one or more lanes, respectively, and applying compression techniques to each of the lanes, determines a final profile by comparing compression performances for each of the candidate profiles, and determines splitting methods and a compression techniques of one or more lanes used in the final profile as an optimal configuration for compressing data of the neural network.

In another general aspect, a computer-readable non-transitory recording medium includes a recording medium on which a program for executing the method described above on a computer is recorded.

In another general aspect, an apparatus for processing data of a neural network includes: a splitter configured to obtain an optimal configuration predetermined by a final profile in which compression techniques set for each lane are defined by dividing the data of the neural network into one or more lanes, to obtain bit representations of data used for processing the neural network, and to split the bit representations into the one or more lanes by using the obtained optimal configuration; a plurality of compressors configured to compress each of the split lanes using the optimum configuration and output the compressed lanes; and a concatenator configured to concatenate the compressed lanes and output compressed bit representations.

The plurality of compressors may compress the split lanes using a compression technique applied to each lane in the optimal configuration in each compressor.

The concatenator may insert a stop code for synchronizing the compressed lanes output from the plurality of compressors.

The concatenator may check whether the stop code is inserted, and may insert a bit value indicating whether the stop code is inserted according to the check result.

In another general aspect, an apparatus for processing data of a neural network includes: a splitter configured to obtain an optimal configuration predetermined by a final profile in which compression techniques set for each lane are defined by dividing the data of the neural network into one or more lanes, obtain compressed bit representations of compressed data of the neural network, and split the compressed bit representations into one or more compressed lanes based on the optimal configuration; a plurality of decompressors configured to decompress each of the split compressed lanes based on the optimum configuration and output the decompressed lanes; and a concatenator configured to concatenate the decompressed lanes and output the decompressed bit representations.

The splitter may predict bit widths of the compressed lanes constituting each of the compressed bit representations based on the optimal configuration, and may split the compressed bit representations into one or more compressed lanes based on the predicted bit widths.

The splitter may check a stop code included in the compressed bit representations.

The splitter may check a bit value indicating whether the stop code is inserted, and may delete the stop code according to a check result.

In another general aspect, an apparatus includes at least one memory configured to store neural network data; and a processor comprising an encoder configured to compress the neural network data and a decoder configured to decompress the compressed neural network data. The encoder is configured to split the neural network data into a plurality of lanes based on a determined optimal configuration and to compress each of the lanes using one or more compression techniques, and the decoder is configured to inversely apply the compression techniques to each of the respective lanes, concatenate the lanes, and output decompressed bit representations corresponding to the neural network data.

Other features and aspects will be apparent from the following detailed description, the drawings, and the claims.

BRIEF DESCRIPTION OF THE DRAWINGS

FIG. 8 is a diagram illustrating a candidate profile generation algorithm according to an example.

FIG. 9 is a diagram illustrating an optimal configuration determination algorithm according to an example.

FIG. 13 is a diagram for describing a method of compressing according to an optimal configuration according to an example.

FIG. 14 is a diagram for describing an encoder according to an example.

FIG. 15 is a diagram for describing a stop code insertion algorithm according to an example.

FIG. 16 is a diagram for describing compression of an encoder according to an example.

FIG. 17 is a block diagram for describing an encoder according to an example.

FIG. 18 is a diagram for describing a decoder according to an example.

FIG. 19 is a block diagram for describing a decoder according to an example.

FIG. 20 is a table for explaining statistical characteristics of neural network data according to an example.

FIG. 21 is a graph for comparing compression rates according to an example.

FIG. 23 is a flowchart of a method of processing data of a neural network in a neural network apparatus according to an example.

Figure 1:
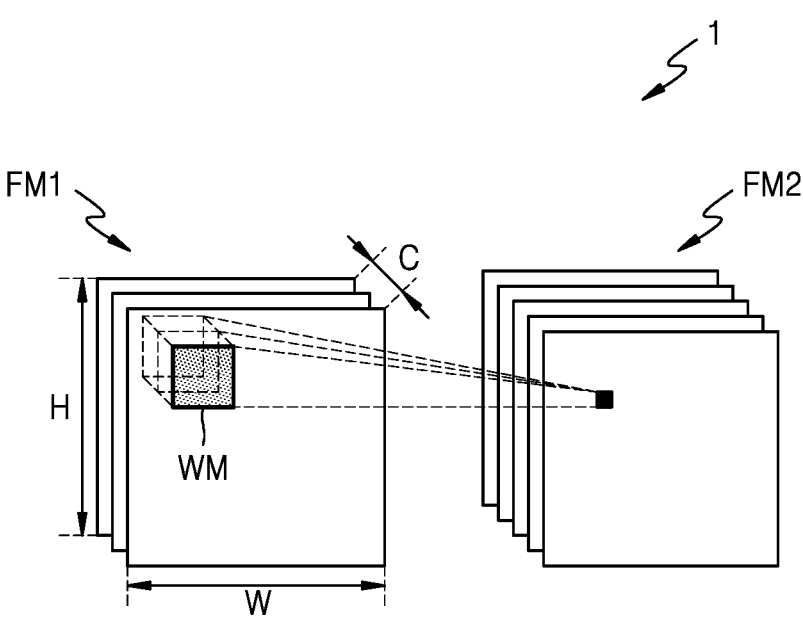
FIG. 1 is a diagram illustrating an architecture of a neural network according to an example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to,"

are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

FIG. 1 is a diagram illustrating an architecture of a neural network 1 according to one or more examples.

Referring to FIG. 1, the neural network 1 may include an architecture of a deep neural network (DNN) or n-layers neural networks. The DNN or n-layers neural networks may correspond to convolutional neural networks (CNNs), recurrent neural networks (RNNs), deep belief networks, restricted Boltzman machines, etc. For example, the neural network 1 may be implemented as a CNN, but is not limited thereto. The neural network 1 of FIG. 1 may be representative of some layers of the CNN. Accordingly, the neural network 1 may be representative of a convolutional layer, a pooling layer, or a fully connected layer, etc. of a CNN. However, for convenience of explanation, in the following descriptions, it is assumed that the neural network 1 corresponds to the convolutional layer of the CNN.

In the convolution layer, a first feature map FM1 may correspond to an input feature map, and a second feature map FM2 may correspond to an output feature map. The feature map may denote a data set representing various characteristics of input data. The first and second feature maps FM1 and FM2 may each be a high-dimensional matrix of two or more dimensions, and have respective activation parameters. When the first and second feature maps FM1 and FM2 correspond to, for example, three-dimensional feature maps, the first and second feature maps FM1 and FM2 have a width W (or column), a height H (or row), and a depth D. The depth D may correspond to the number of channels.

In the convolution layer, a convolution operation with respect to the first feature map FM1 and a weight map WM may be performed, and as a result, the second feature map FM2 may be generated. The weight map WM may filter the first feature map FM1 and is referred to as a filter or kernel. In one example, a depth of the weight map WM, that is, the number of channels is the same as the depth D of the first feature map FM1, that is, the number of channels. The weight map WM is shifted by traversing the first feature map FM1 as a sliding window. In each shift, weights included in the weight map WM may respectively be multiplied and added to all feature values in a region overlapping with the first feature map FM1. As the first feature map FM1 and the weight map WM are convolved, one channel of the second feature map FM2 may be generated.

In FIG. 1, although one weight map WM is depicted, substantially a plurality of channels of the second feature map FM2 may be generated by converging the plurality of weight maps with the first feature map FM1. The second feature map FM2 of the convolution layer may be an input feature map of the next layer. For example, the second feature map FM2 may be an input feature map of a pooling layer. The present example is not limited to such a configuration.

Figure 2:
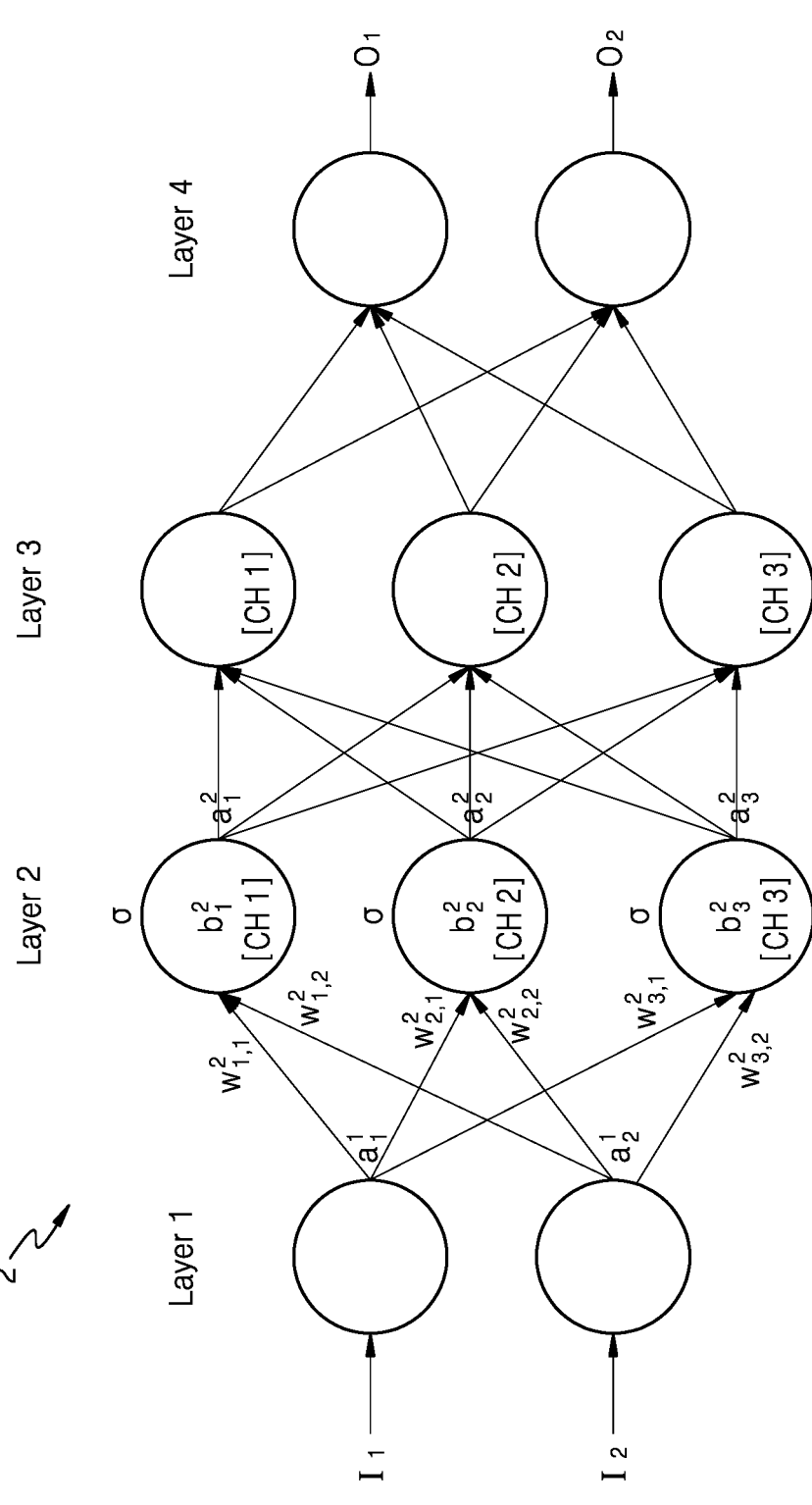
FIG. 2 is a diagram for explaining an operation performed in a neural network according to an example.

FIG. 2 is a diagram for explaining an operation performed in a neural network 2 according to one or more examples.

Referring to FIG. 2, the neural network 2 has a structure including input layers, hidden layers, and output layers, and performs operations based on received input data (for example, $I_1$ and $I_2$), and may generate output data (for example, $O_1$ and $O_2$) based on a result of the operations.

As described above, the neural network 2 may be a DNN or an n-layer neural network including two or more hidden layers. For example, as illustrated in FIG. 2, the neural network 2 may be a DNN including an input layer (Layer 1), two hidden layers (Layer 2 and Layer 3), and an output layer (Layer 4). When the neural network 2 is implemented as a DNN architecture, the neural network 2 includes a large number of layers capable of processing valid information, and thus, the neural network 2 may process a large number of complex data sets than a neural network having a single layer. However, although the neural network 2 is illustrated as including four layers, this is only an example, and the neural network 2 may include a smaller or larger number of layers, or a smaller or larger number of channels. That is, the neural network 2 may include layers of various structures different from those illustrated in FIG. 2.

Each of the layers included in the neural network 2 may include a plurality of channels. A channel may be representative of a plurality of artificial nodes, known as neurons, processing elements (PEs), units, or similar terms. For example, as illustrated in FIG. 2, Layer 1 may include two channels (nodes), and each of Layer 2 and Layer 3 may include three channels. However, this is only an example, and each of the layers included in the neural network 2 may include various numbers of channels (nodes).

The channels included in each of the layers of the neural network 2 may be connected to each other to process data. For example, one channel may receive data from other channels for operation and output the operation result to other channels.

Each of inputs and outputs of each of the channels may be referred to as an input activation and an output activation. That is, the activation may be an output of one channel and may be a parameter corresponding to an input of channels included in the next layer. Meanwhile, each of the channels may determine its own activation based on activations and weights received from channels included in the previous layer. The weight is a parameter used to operate an output activation in each channel, and may be a value assigned to a connection relationship between channels.

Each of the channels may be processed by a computational unit or a processing element that outputs an output activation by receiving an input, and an input-output of each of the channels may be mapped. For example, when a is an activation function, $$w_{jk}^{j}$$

is a weight from a $k^{th}$ channel included in an $(i-1)^{th}$ layer to a $j^{th}$ channel included in an layer, $$b_{j}^{i}$$

is a bias of the $j^{th}$ channel included in the $i^{th}$ layer, and $$a_{j}^{i}$$

is an activation of the $j^{th}$ channel in the $i^{th}$ layer, the activation may be calculated by using Equation 1 below.

$$a_{j}^{i} = \sigma\left(\sum_{k}(w_{jk}^{i} \times a_{k}^{i-1}) + b_{j}^{i}\right) \qquad \text{Equation 1}$$

As shown in FIG. 2, the activation of a first channel CH1 of the second layer Layer 2 may be expressed as $$a_{1}^{2}.$$

Also, $$a_{1}^{2}$$

may have a value of $$a_{1}^{2} = \sigma(w_{1,1}^{2} \times a_{1}^{1} + w_{1,2}^{2} \times a_{2}^{1} + b_{1}^{2})$$

according to Equation 1. The activation function a may be a Rectified Linear Unit (ReLU), but is not limited thereto. For example, the activation function a may be a sigmoid, a hyperbolic tangent, a maxout, etc.

As described above, in the neural network 2, a large number of data sets are exchanged between a plurality of interconnected channels, and a number of computational processes are performed through layers. Therefore, there is a need for a technique capable of reducing a memory required to process complex data of the neural network 2.

On the other hand, data compression may reduce an amount of memory traffic of an operation of the neural network 2 and improve the performance of the operation of the neural network 2 limited by a memory bound by compressing the neural network data. Here, the memory bound may denote that a time to complete an operation is determined by an amount of memory.

Neural network data is data used in various processes related to machine learning by using a neural network, and may include all static data and dynamic data used or processed in processes of a neural network regardless of whether a data value is changed or not. Neural network data may include all data having different precisions.

Neural network data may include all data, such as values assigned to connection relations of the layers described above, input and output values used in various phases of a process using a neural network, such as the result of multiply-accumulate (MAC) operation, and preset values for the use of a process, etc., with no restrictions on a representation format and usage time. For example, the data of the neural network may include at least one of activations, weights, and gradients of the neural network, but is not limited thereto, and may be data values used or processed in an inference process or a learning process of the neural network.

The one or more examples herein provide a method of compressing various neural network data with no restrictions on a representation format and usage time, thereby reducing a memory access burden and generally performing compression in different neural networks.

Hereinafter, a method of compressing neural network data used in the neural network 2 will be described in detail with reference to drawings.

Figure 3:
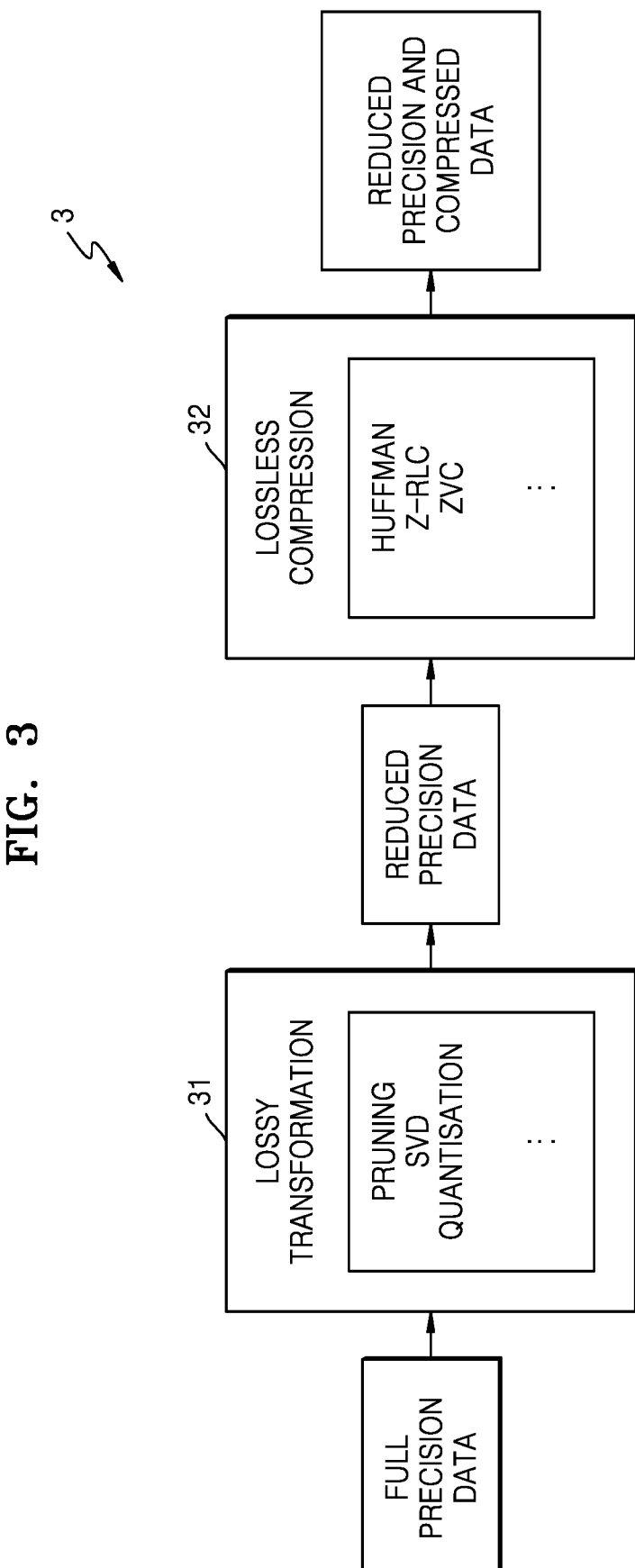
FIG. 3 is a diagram illustrating a compression pipeline for data compression according to an example.

FIG. 3 is a diagram illustrating a compression pipeline 3 for data compression according to an example.

Referring to FIG. 3, the compression pipeline 3 includes a lossy transformation block 31 and a lossless compression block 32. Since the compression pipeline 3 is used, an amount of memory traffic may be reduced and the performance of machine learning workloads limited by a memory bound may be improved. For example, full-precision data at a 32-bit floating point may be compressed by a lossy transformation and/or lossless compression for training or inference. The lossy transformation compresses data by reducing an amount of information in the data, and lossless compression may compress data by increasing information density.

The loss transformation technique includes Pruning, single value decomposition (SVD), and quantization, and the lossless compression technique includes Huffman coding, run-length coding on zeros (Z-RLC), and zero-value compression (ZVC), etc.

However, hardware complexities of the lossless compression technique considerably vary, and some compression techniques may be infeasible in hardware with limited resources, such as an embedded system. As a result, a light-weight lossless compression technique that reliably implements a high compression rate at low hardware cost is required.

Meanwhile, a total compression rate of neural network data may be a compression rate of lossy transform (P) and lossless compression (C) (e.g., total compression rate=P×C). However, in the following description, the compression rate is assumed to be the compression rate of lossless compression. However, the compression method according to the examples is not limited thereto, and an overall compression rate may be increased by combining with various lossy transformations, lossless compressions, and/or quantization methods.

For example, quantization may improve the overall compression rate by combining with lossless compression. Quantization may effectively reduce senseless information of neural network data that are random and have high entropy. Accordingly, after the neural network data is quantized, the amount of information is small, but more meaningful information remains, and thus, the compression rate may be increased.

Figure 4:
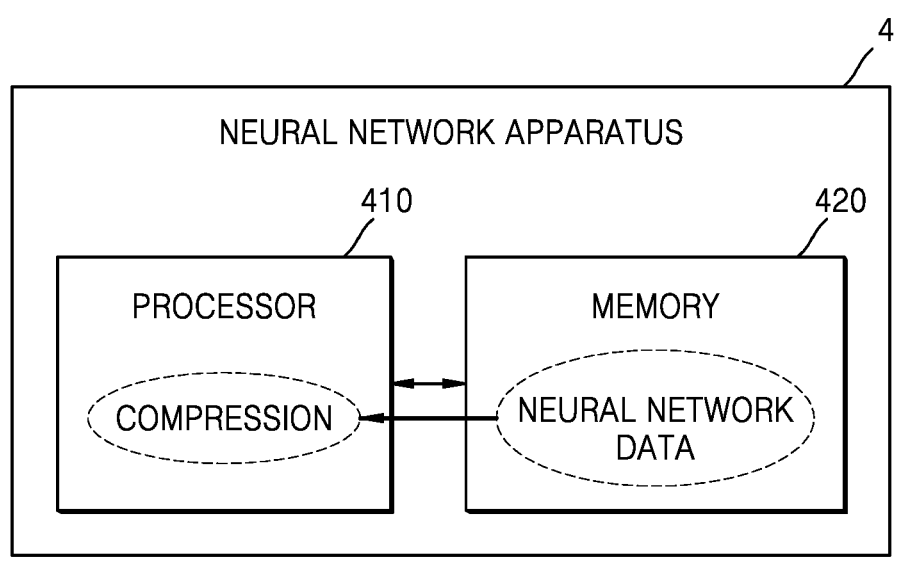
FIG. 4 is a block diagram showing a hardware configuration of a neural network apparatus according to an example.

FIG. 4 is a block diagram showing a hardware configuration of a neural network apparatus according to an example.

Referring to FIG. 4, the neural network apparatus 4 includes a processor 410 and a memory 420. In the neural network apparatus 4 shown in FIG. 4, only components related to the present examples are shown. Accordingly, it is apparent to those skilled in the art that the neural network apparatus 4 may further include other general-purpose components in addition to the components shown in FIG. 4.

The neural network apparatus 4 may correspond to a computing device having various processing functions, such as generating a neural network, training (or learning) a neural network, analyzing statistical characteristics of neural network data, determining a profile for compressing neural network data, splitting the neural network data into a plurality of lanes and compressing each of the plurality of lanes separately, performing inference using a neural network, or retraining the neural network. For example, the neural network apparatus 4 may be implemented as various types of devices, such as a personal computer (PC), a server device, and a mobile device, etc.

The neural network apparatus 4 may determine an optimum configuration for compression of neural network data and perform compression considering the processing performance of a device (for example, a mobile device, an embedded device, etc.) to which the neural network is deployed. Devices to which the neural network is deployed include, for example, autonomous vehicles, robotics, smartphones, tablet devices, augmented reality (AR) devices, and Internet of Things (IoT) devices that perform voice recognition, video recognition, etc. using neural networks, etc., but are not limited thereto.

According to the present example, additional neural network apparatuses may exist in addition to the neural network apparatus 4. The neural network apparatus 4 and additional neural network apparatuses may each perform separate functions for compressing neural network data. For example, the neural network apparatus 4 may determine a profile for compressing neural network data, and other neural network apparatuses may compress the neural network data using the profile. However, in the following description, for convenience of explanation, it is assumed that one neural network apparatus 4 performs all functions, and the same will be applied to FIG. 5 to be described later.

The profile may denote a set of information including information about methods of processing a bit representation of neural network data and information about a plurality of compression techniques for compressing the processed bit representation.

The processor 410 may generate a plurality of candidate profiles by obtaining one or more bit representations of neural network data, and determine a final profile for compressing the neural network data among the candidate profiles.

The candidate profiles may denote profiles generated as candidates to be selected as a final profile and having different conditions.

The final profile may denote a profile including final information on how the neural network apparatus 4 compresses neural network data.

The processor 410 may determine splitting methods and compression techniques of one or more lanes used in the final profile as an optimal configuration for compression of neural network data. As the optimal configuration is determined, an optimal method for compressing neural network data may be determined.

The processor 410 may split neural network data into one or more bit segments according to an optimal configuration, and compress each bit segment with an optimal compression technique. Statistical characteristics of each bit segment may be exposed by splitting the neural network data into a plurality of bit segments. Since the processor 410 applies a suitable optimal compression technique to the exposed statistical characteristics of each bit segment, the compression rate may be increased.

When a data value is split into a plurality of bits, a bit segment may denote a group of bits forming a section of each data.

Here, one bit segment may be referred to as a lane. A technique for compressing a plurality of lanes by applying a compression technique suitable for each lane may be referred to as lane compression.

A method of determining an optimum configuration for compression of neural network data by the processor 410 and a specific method of compressing neural network data according to the determined optimum configuration will be described in detail below with reference to related drawings.

The processor 410 performs an overall function for controlling the neural network apparatus 4. For example, the processor 410 controls an overall operation of the neural network apparatus 4 by executing programs stored in the memory 420 in the neural network apparatus 4. The processor 410 may be implemented as a central processing unit (CPU), a graphic processing unit (GPU), or an application processor (AP) provided in the neural network quantization apparatus 10, but is not limited thereto.

The memory 420 is hardware that stores various data processed in the neural network apparatus 4. For example, the memory 420 may store data processed and data to be processed in the neural network apparatus 4. Also, the memory 420 may store applications, drivers, and the like to be driven by the neural network apparatus 4. The memory 420 may be DRAM, but is not limited thereto. The memory 420 may include at least one of volatile memory and nonvolatile memory. The non-volatile memory includes read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), etc. The volatile memory includes dynamic RAM (DRAM), static RAM (SRAM), synchronous DRAM (SDRAM), PRAM, MRAM, RRAM, FeRAM, etc. In an embodiment, the memory 120 may include at least one of hard disk drive (HDD), solid state drive (SSD), compact flash (CF), secure digital (SD), micro secure digital (micro-SD), mini-SD (mini secure digital), xD (extreme digital), and Memory Stick.

The memory 420 may store, for example, neural network data, and may store various programs related to a training algorithm, a compression algorithm, a profiling algorithm, etc. of a neural network to be executed by the processor 410.

The profiling algorithm may refer to an algorithm that draws a method of compressing neural network data to be compressed by using profiles.

Figure 5:
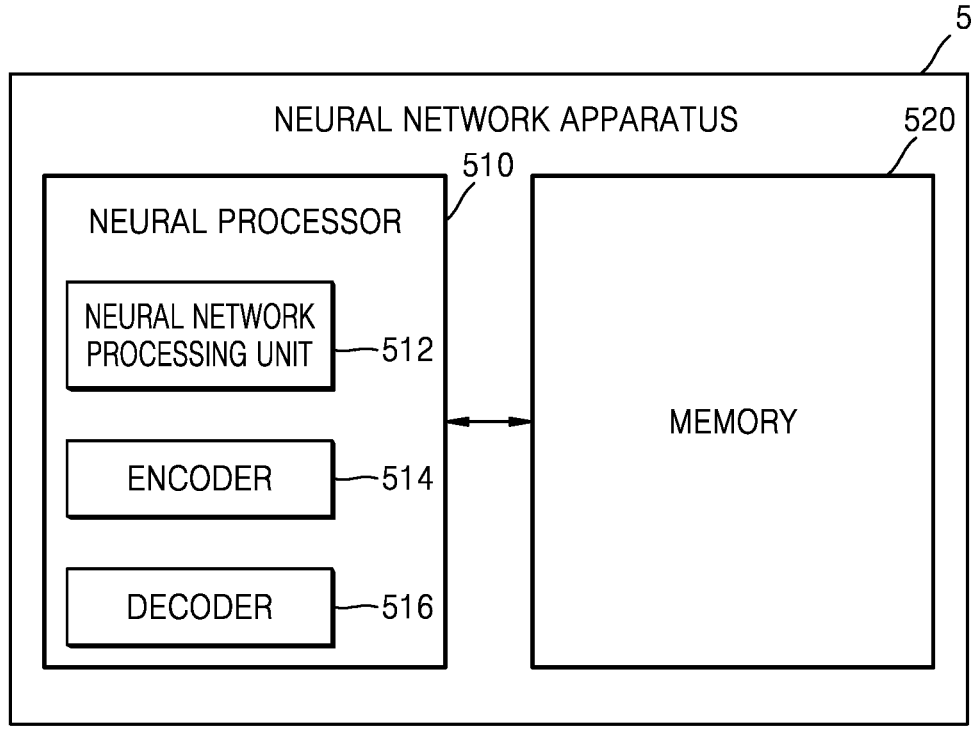
FIG. 5 is a block diagram showing a hardware configuration of a neural network apparatus according to an example.

FIG. 5 is a block diagram showing a hardware configuration of a neural network apparatus 5 according to an example.

Referring to FIG. 5, the neural network apparatus 5 includes a neural processor 510 and a memory 520. The neural processor 510 may further include a neural network processing unit 512, an encoder 514 and a decoder 516. The neural processor 510 and the memory 520 of the neural network apparatus 5 may perform the same roles as the processor 410 and the memory 420 of FIG. 4.

The neural processor 510 may perform operations for driving the neural network described above. For example, operations may be operations required for inference, training, and re-training according to input data. The neural processor 510 may compress neural network data used for operations by using an optimal configuration, and decompress the compressed data of the neural network by using the optimal configuration.

The neural network processing unit 512 may control the encoder 514 and the decoder 516. For example, the neural network processing unit 512 may control the encoder 514 to compress neural network data and the decoder 516 to decompress the compressed neural network data.

Compression and decompression using the encoder 514 and the decoder 516 will be described in detail with reference to FIGS. 14 to 19.

Meanwhile, the neural network apparatus 5 of FIG. 5 may be the neural network apparatus 4 (FIG. 4) described above, or an additional neural network apparatus other than the neural network apparatus 4.

Figure 6:
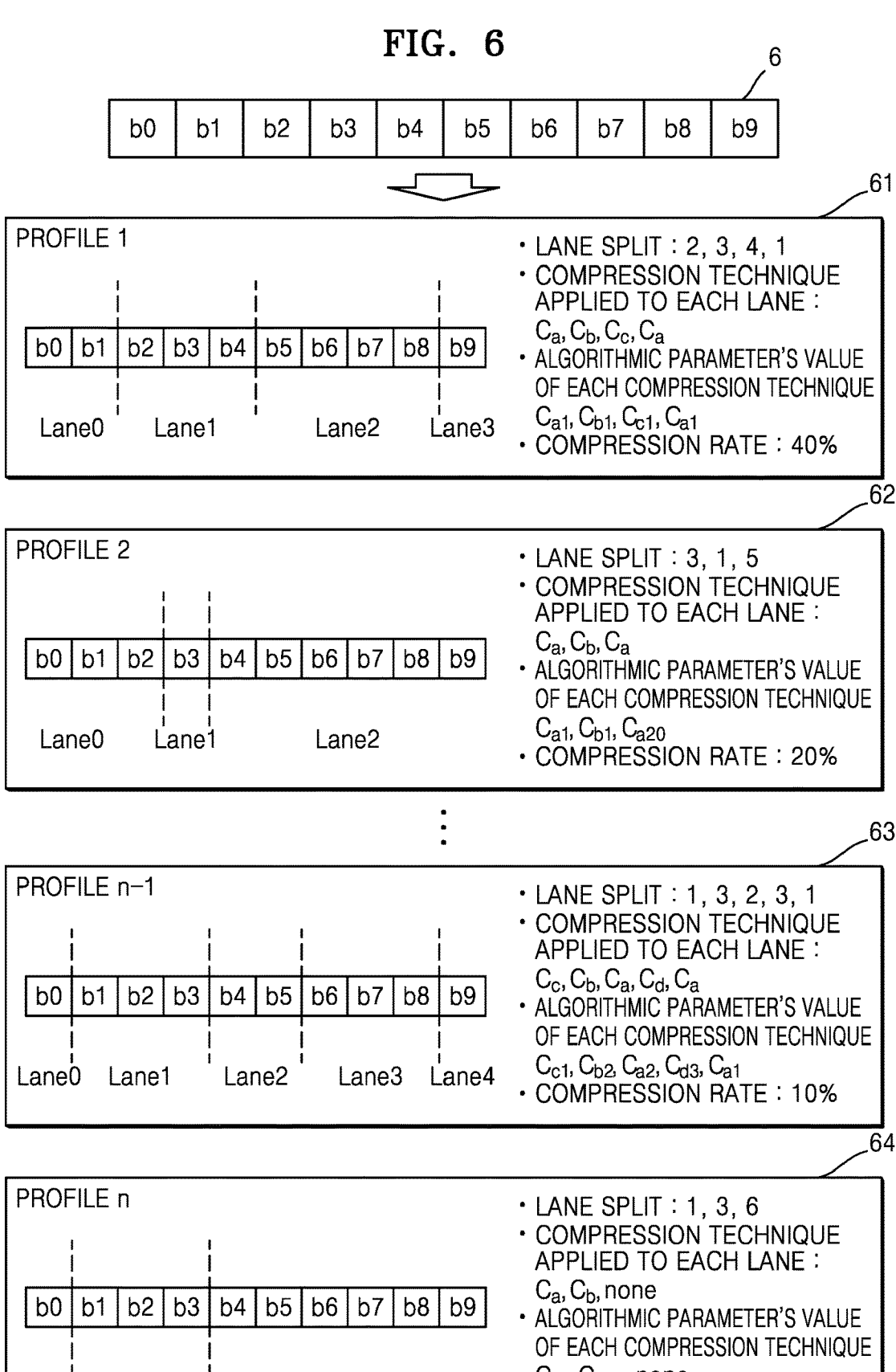
FIG. 6 is a conceptual diagram for explaining a method of generating a profile according to an example.

FIG. 6 is a conceptual diagram for explaining a compression method according to an example. Referring to FIG. 6, the processor 410 (refer to FIG. 4) may perform profiling to compress neural network data.

The processor 410 may obtain a bit representation 6 of neural network data from the memory 420 (refer to FIG. 4). The obtained bit representation 6 may be a bit stream. For example, the neural network data may include at least one of activation, weight, and gradient of the neural network 2 (refer to FIG. 2), and the processor 410 may obtain a bit stream of weight data of the neural network 2.

Neural network data used for processing a neural network may be expressed as a bit stream including 10 bits (b0, b1, b2, b3, b4, b5, b6, b7, b8 and b9). Here, the bit representation 6 of the neural network data is illustrated as a bit stream including 10 bits for explanation, but the data format of the neural network data and the number of bits constituting the bit stream are not limited thereto.

Although only one bit representation 6 is shown for explanation, the processor 410 may obtain a plurality of bit representations. In a neural network, there may be a myriad of data defined by such bit representation. The processor 410 may determine a final profile by obtaining a single bit representation, and determine a final profile by obtaining a plurality of bit representations.

The processor 410 may generate a plurality of candidate profiles by dividing one or more bit representations of the obtained data into one or more lanes, and applying compression techniques to each lane.

For example, the processor 410 may generate candidate profiles 61, 62, 63, and 64 by dividing the bit representation 6 into one or more lanes and applying compression techniques to each lane. However, in FIG. 6, only four candidate profiles 61, 62, 63, and 64 are shown for convenience of description, but in fact, candidate profiles may be generated in various numbers.

Lanes may denote bit segments having a predetermined bit width generated by splitting a bit stream. For example, in the bit representation 6 of profile 1 (61), Lane 0 is a bit segment with a bit width of 2, Lane 1 is a bit segment with a bit width of 3, Lane 2 is a bit segment with a bit width of 4, and Lane 3 is a bit segment having a bit width of 1.

The processor 410 may generate candidate profiles 61, 62, 63, and 64 by differently applying at least one of a splitting method and a compression technique for splitting bit representations into one or more lanes.

The candidate profiles 61, 62, 63, and 64 may include all combinations for splitting the bit representation 6. For example, the candidate profiles 61, 62, 63, and 64 may include profiles in which the number of lanes for dividing the bit representation 6 into a plurality of bit segments and the bit width of the bit segment corresponding to each of the lanes are differently set.

In profile 1 (61), the number of lanes is 4, and bit widths corresponding to each of the lanes are 2, 3, 4, and 1. In profile 2 (62), the number of lanes is 3, and bit widths corresponding to each of the lanes are 3, 1, and 5. In profile n−1 (63), the number of lanes is 5, and bit widths corresponding to each of the lanes are 1, 3, 2, 3, and 1. In profile n (64), the number of lanes is 3, and bit widths corresponding to each of the lanes are 1, 3, and 6. FIG. 6 shows only profiles in which one of the number of lanes and the bit width corresponding to each of the lanes are different from each other. However, profiles in which the number of lanes and the bit width corresponding to each of the lanes are the same and compression techniques are different may also be included.

The candidate profiles 61, 62, 63, and 64 may include all combinations capable of allocating a plurality of compression techniques to each lane split by any one of the splitting methods.

For example, in the candidate profiles 61, 62, 63, and 64, compression techniques may be independently applied to each lane. A $C_a$ compression technique may be applied to Lane 0 of the profile 2 (62), a $C_b$ compression technique may be applied to Lane 1, and a $C_a$ compression technique may be applied to Lane 2 again. As compression techniques are applied independently to each lane, the same compression technique may be applied to different lanes.

For example, in the candidate profiles 61, 62, 63, and 64, different compression techniques may be applied to each lane. In the profile n (64), different $C_a$, $C_b$, and none among a plurality of compression methods ($C_a$, $C_b$, $C_c$, $C_d$, and none) may be applied to each lane. "none" may denote a compression technique that does not compress a lane.

The candidate profiles 61, 62, 63, and 64 may include profiles to which compression techniques having different algorithmic parameters are applied.

The algorithmic parameter denotes a parameter used when using a specific compression technique. Each of the compression techniques may have a corresponding algorithmic parameter, and a plurality of compression techniques may have algorithmic parameters different from each other. For example, a maximum sequence may be an algorithmic parameter of a run-length coding on zeros (Z-RLC), a size of matrix may be an algorithmic parameter of a compressed sparse column/row (CSC/CSR), and a size of block may be an algorithmic parameter of a dynamic precision reduction (DPRed).

However, some compression techniques may not have a corresponding algorithmic parameter. For example, zero-value compression (ZVC) may not have a corresponding algorithmic parameter.

A value of an algorithmic parameter may have a controllable range. As the values of the algorithmic parameters are controlled differently, the compression performance and the degree of required memory resources may be different. For example, referring to profile 2 (62), a compression technique of $C_a$ is applied to both Lane 0 and Lane 2, but values of each algorithmic parameter may be different from each other as $C_{a1}$ and $C_{a20}$.

The processor 410 may determine a final profile by comparing compression performances for each of the generated candidate profiles 61, 62, 63, and 64. The compression performances may include a time complexity of each profile, the size of a required memory space, a compression rate, and statistical characteristics, but are not limited thereto.

For example, the processor 410 may calculate compression rates corresponding to each of the candidate profiles 61, 62, 63, and 64, and may determine a candidate profile having the highest compression rate among the calculated compression rates as the final profile. The processor 410 may calculate that the profile 1 (61) has a compression rate of 40%, the profile 2 (62) has a compression rate of 20%, the profile n−1 (63) has a compression rate of 10%, and the profile n (64) has a compression rate of 50%. If the compression rate of profiles between the profile 2 (62) and the profile n−1 (63) is less than 50%, since the compression rate of the profile n (64) is the greatest among the candidate profiles, the profile n (64) will be determined as the final profile.

Figure 7A:
FIGS. 7A, 7B, and 7C are diagrams for explaining a statistical distribution according to an activation split according to an example.
Figure 7B:
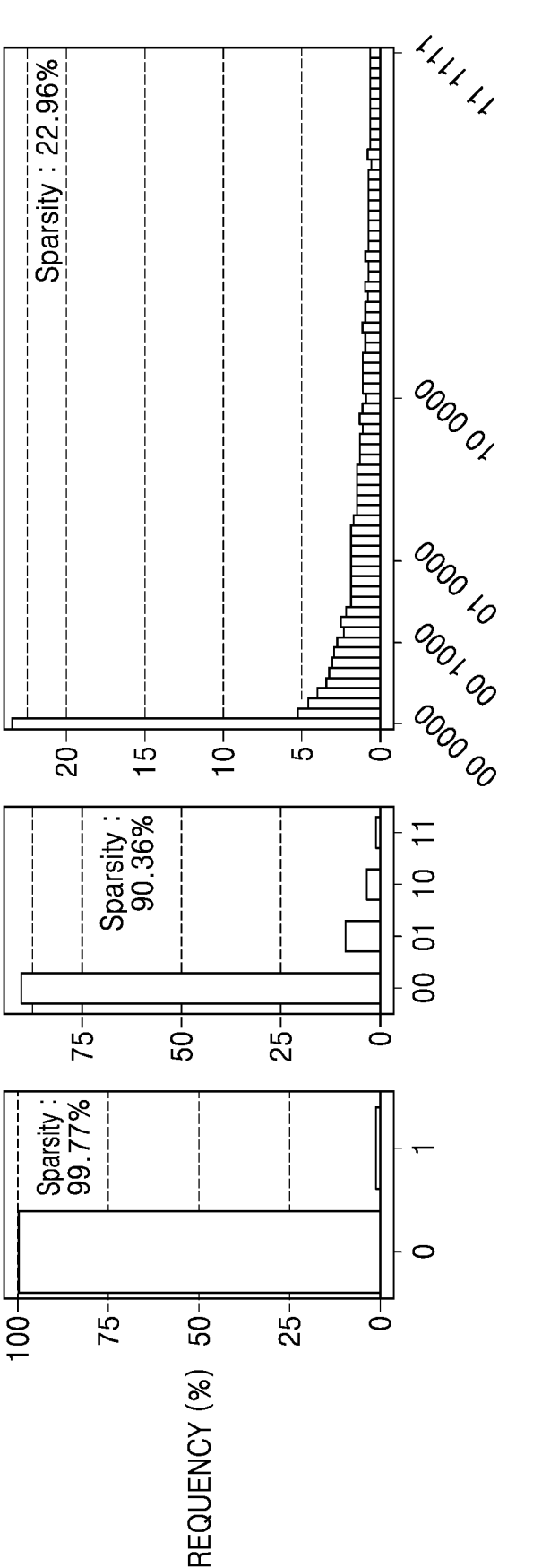
Figure 7C:
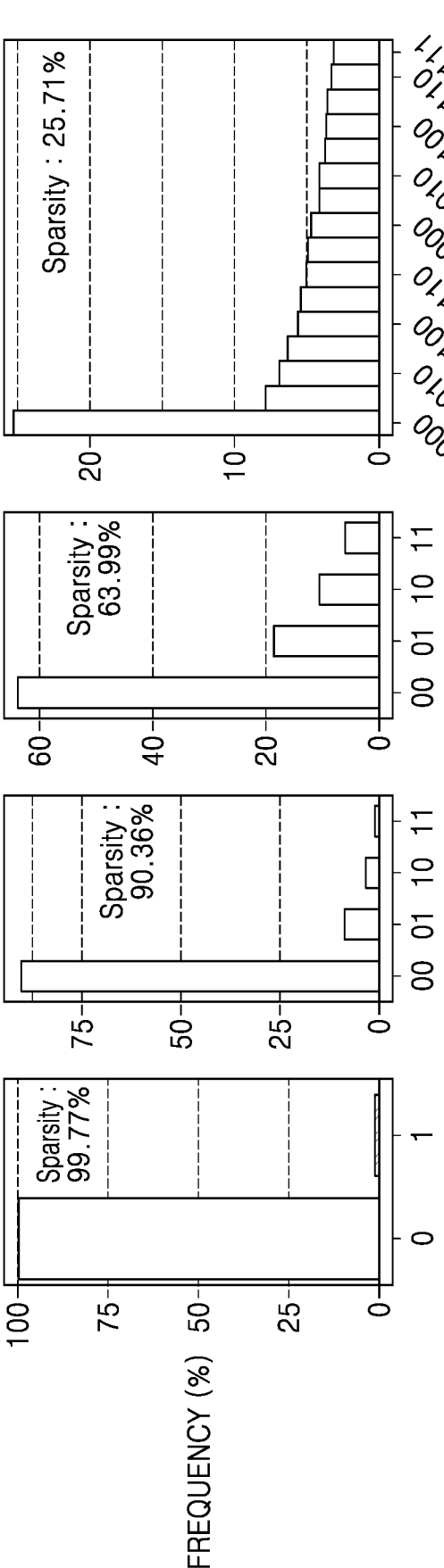

FIGS. 7A, 7B, and 7C are graphs for explaining a statistical distribution according to an activation split according to an example.

Referring to FIGS. 7A to 7C, the candidate profiles 61, 62, 63, and 64 may include profiles having different sparsity distributions of lanes according to the number and bit width of the lanes. In other words, different portions of neural network data may have different sparsity distributions. The first graph 7a shows a sparsity distribution when there is only one lane. The second graph 7b shows a sparsity distribution when there are three lanes and each bit width is 1, 2, and 6, and the third graph 7c shows a sparsity distribution when there are four lanes and each bit width is 1, 2, 2, and 4.

When comparing lane 0 and lane 1 of the second graph 7b with lane 0 of the first graph 7a, it may be seen that lane 0 and lane 1 of the second graph 7b tend to be very sparse. When comparing lane 2 of the third graph 7c with lane 0 of the first graph 7a, it may be seen that lane 2 of the third graph 7c still tends to be sparse. That is, the most significant bits (MSB) of lane 0 of the first graph 7a, which is not split, tend to be very sparse, and as progresses towards the least significant bits (LSB), the sparsity may be reduced.

In this way, the sparsity distribution of each of the lanes may be different according to the splitting method. Since lanes having high sparsity may be more easily compressed than lanes having low sparsity, the compression rate may increase according to the splitting method.

The candidate profiles 61, 62, 63, and 64 may include a profile to which a compression technique that does not compress a lane including the least significant bit (LSB) among lanes is applied. Lane 2 of the second graph 7b and lane 3 of the third graph 7c may have lower sparsity than lane 0 of the first graph 7a. Data having low sparsity may have a low compression rate, or may have a greater data capacity. Accordingly, rather, the compression rate may be increased by compressing only lanes having high sparsity and by not compressing lanes having low sparsity.

Figure 7D:
FIGS. 7D, 7E, and 7F are diagrams for explaining a statistical distribution according to a weight split according to an example
Figure 7E:
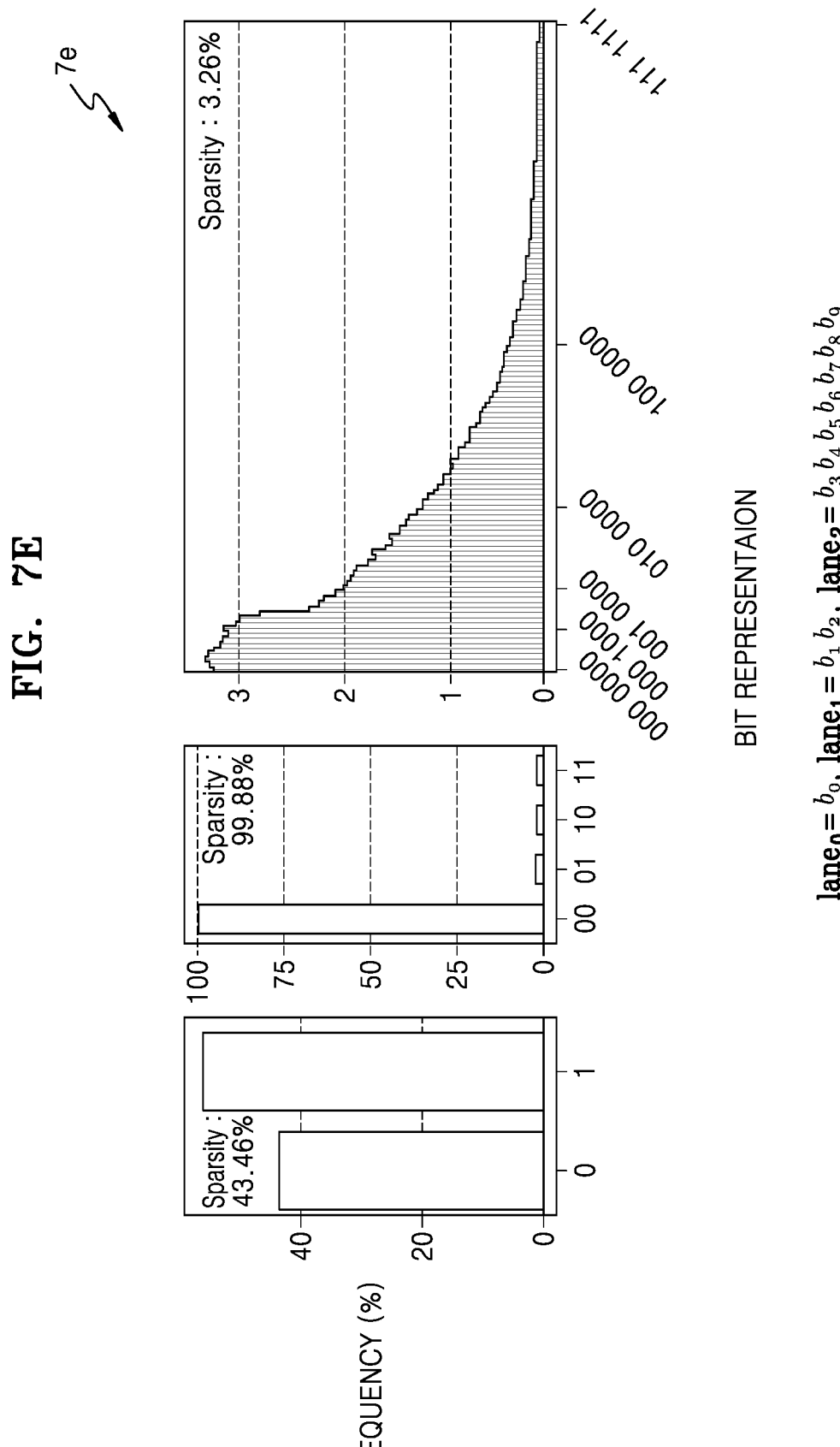
Figure 7F:
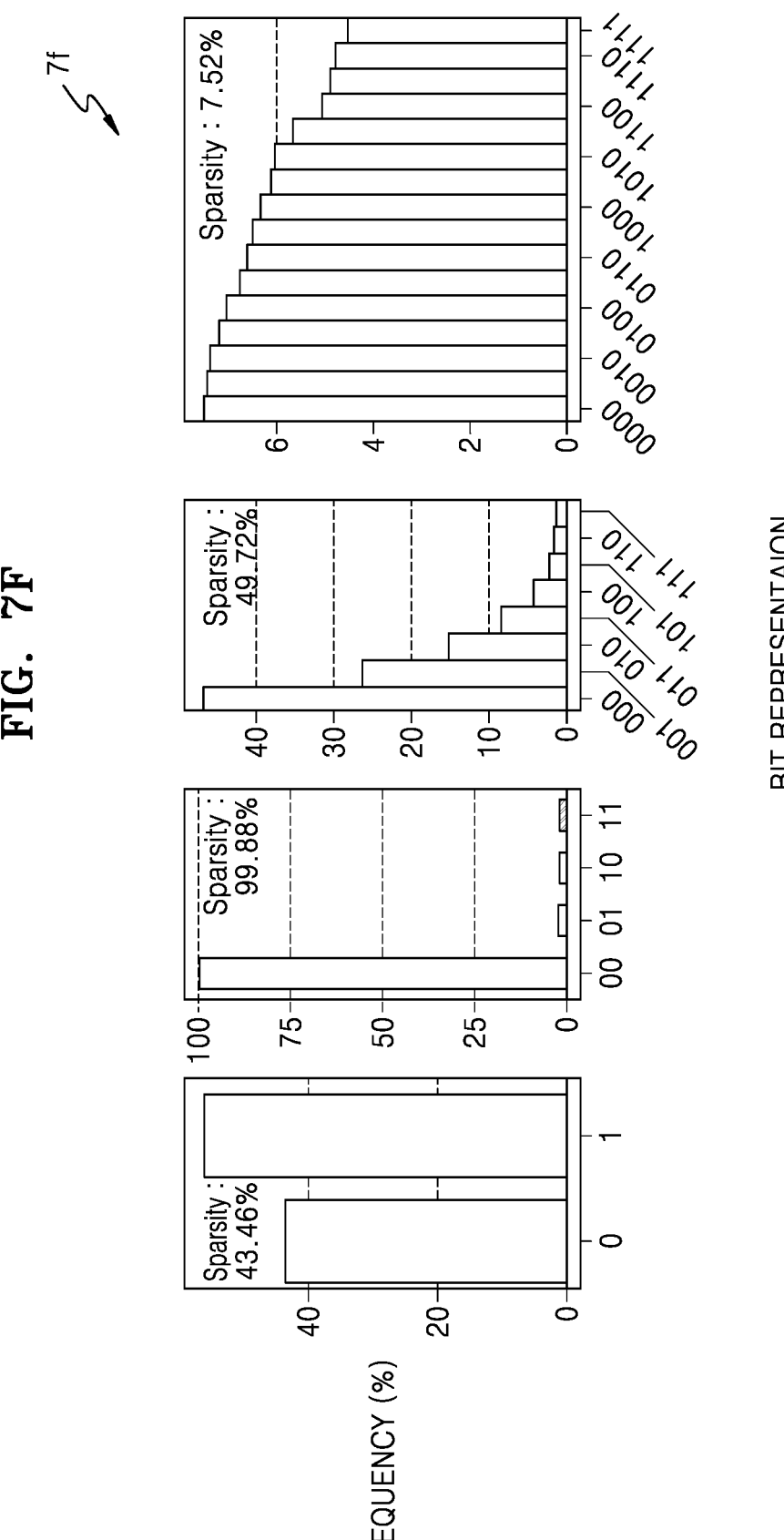

FIGS. 7D to 7F are graphs for explaining a statistical distribution according to a weight split according to an example.

Referring to FIGS. 7D to 7F, it may be seen that even if the type of neural network data is weight, the neural network data has a sparsity distribution similar to those of FIGS. 7A to 7C.

The fourth graph 7d shows a sparsity distribution when there is only one lane. The fifth graph 7e shows a sparsity distribution when there are three lanes and each bit width is 1, 2, and 7, and the sixth graph 7f shows a sparsity distribution when there are four lanes and each bit width is 1, 2, 3, and 4.

When comparing lane 0 and lane 1 of the fifth graph 7e with lane 0 of the fourth graph 7d, it may be seen that lane 0 and lane 1 of the fifth graph 7e tend to be very sparse. When comparing lane 2 of the sixth graph 7f with lane 0 of the fourth graph 7d, it may be seen that lane 2 of the sixth graph 7f still tends to be sparse.

On the other hand, in FIG. 7D, the most significant bit (MSB) corresponding to a sign bit b0 of the bit stream is not omitted, and in FIG. 7A, the sign bit b0 of the bit stream is omitted, and thus, there may be differences in the shape of the sparsity distribution. For example, if the neural network data value is always positive, the sign bit may be omitted.

FIG. 8 is a diagram illustrating a candidate profile generation algorithm 8 according to an example.

Referring to FIG. 8, the candidate profile generation algorithm 8 may be used to generate the candidate profiles described with reference to FIG. 6.

In operation 81, the processor 410 (refer to FIG. 4) obtains neural network data, a bit width of bit representations, compression techniques, and algorithmic parameters corresponding to each of the compression techniques.

In operation 82, the processor 410 generates all splitting methods in which the number of lanes and/or a bit width of each of the lanes are different.

In operation 83, the processor 410 generates candidate profiles having different compression techniques and/or algorithmic parameters for all splitting methods.

In operation 84, the processor 410 outputs a result of generating candidate profiles.

FIG. 9 is a diagram illustrating an optimal configuration determination algorithm 9 according to an example.

Referring to FIG. 9, the optimal configuration determination algorithm 9 may be used to determine a final profile and optimal configuration described with reference to FIG. 6.

In operation 91, the processor 410 (refer to FIG. 4) obtains candidate profiles generated in the candidate profile generation algorithm 8 of FIG. 8, a bit width of bit representations, compression techniques, symbol-based compression techniques, algorithmic parameters corresponding to each compression technique, and constraints when implementing in hardware.

In operation 92, the processor 410 (refer to FIG. 4) obtains a set of cases of splitting each lane by all splitting methods in which the number of lanes and/or a bit width of each of the lanes are different.

In operation 93, the processor 410 determines a final profile and an optimal configuration in consideration of a set of all splitting cases obtained in operation 92 and the constraints obtained in operation 91.

In operation 94, the processor 410 outputs an optimal configuration.

Figure 10:
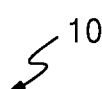
FIG. 10 is a diagram illustrating an algorithm for determining an optimal compression technique and a value of an algorithmic parameter according to an example.

FIG. 10 is a diagram illustrating an algorithm 10 for determining an optimal compression technique and a value of an algorithmic parameter according to an example.

Referring to FIG. 10, when determining a final profile in operation 93 of FIG. 9, the algorithm 10 for determining an optimal compression technique and a value of an optimal algorithmic parameter may be used.

In operation 100, the processor 410 repeatedly compares compression performances with respect to all algorithmic parameter values that all compression techniques may have, and determines an optimum compression technique and an optimum algorithmic parameter value.

The algorithms 8, 9, and 10 of FIGS. 8 to 10 are described as examples of determining an optimal configuration, and an algorithm for determining the optimal configuration is not limited to the algorithms 8, 9, and 10 of FIGS. 8 to 10.

Figure 11:
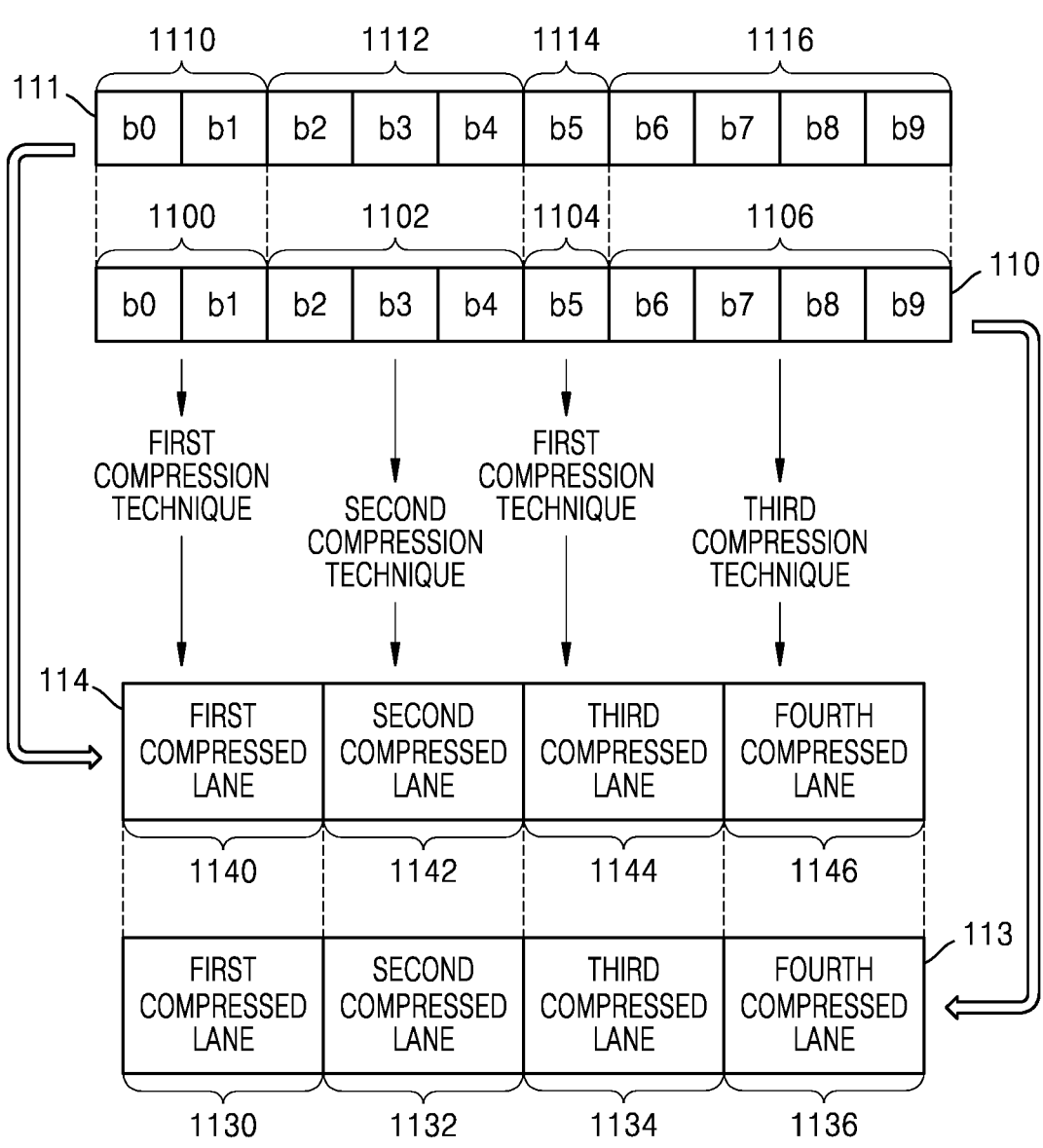
FIG. 11 is a diagram for describing compression of a bit representation according to an example.

FIG. 11 is a diagram for describing compression of a bit representation according to an example.

Referring to FIG. 11, an optimal configuration for compression of neural network data for a first bit representation 110 having a bit width of 10 bits may be determined by the method for determining an optimal configuration described above with reference to FIG. 6. For example, the optimal configuration may be determined by splitting the first bit representation 110 in order from the most significant bits (MSB) to four lanes 1100, 1102, 1104 and 1106 having bit widths of 2, 3, 1 and 4, and by compressing each lane by a first compression technique, a second compression technique, the first compression technique, and a third compression technique, respectively.

The processor 410 or 510 may compress the lanes 1100, 1102, 1104, 1106, 1110, 1112, 1114 and 1116 of bit representations 110 and 111 using an optimal configuration, and may output compressed lanes 1130, 1132, 1134, 1136, 1140, 1142, 1144 and 1146.

The processor 410 or 510 may compress the split lanes 1100, 1102, 1104 and 1106 of the first bit representation 110 using an optimal configuration, and may output the compressed lanes 1130, 1132, 1134 and 1136. For example, the processor 410 or 510 may output the first compressed lane 1130 by compressing the first lane 1100 of the first bit representation 110 by using a first compression technique, may output the second compressed lane 1132 by compressing the second lane 1102 of the first bit representation 110 by using a second compression technique, may output the third compressed lane 1134 by compressing the third lane 1104 of the first bit representation 110 by using the first compression technique, and may output the fourth compressed lane 1136 by compressing the fourth lane 1106 of the first bit representation 110 by using a third compression technique.

The processor 410 or 510 may compress the split lanes 1110, 1112, 1114, and 1116 of the second bit representation 111 by using an optimal configuration, and output the compressed lanes 1140, 1142, 1144, and 1146. For example, the processor 410 or 510 may output the first compressed lane 1140 by compressing the first lane 1110 of the second bit representation 111 by using a first compression technique, may output the second compressed lane 1142 by compressing the second lane 1112 of the second bit representation 111 by using a second compression technique, may output the third compressed lane 1144 by compressing the third lane 1114 of the second bit representation 111 by using the first compression technique, and may output the fourth compressed lane 1146 by compressing the fourth lane 1116 of the second bit representation 111 by using a third compression technique.

The first bit representation 110 and the second bit representation 111 are split and compressed in the same optimal configuration, but values of each of the bit representations may be different from each other. Even if the same compression technique (first compression technique) is applied to the same lanes 1110 and 1100 according to a value of each bit representation, values of the compressed lanes 1140 and 1130 may be different from each other. The compressed lanes 1140 and 1130 having values from each other may have different bit widths and compressed lane values, may have the same bit width and different compressed lane values, and may have the same compressed lane value and different bit widths.

Meanwhile, the compressed lanes 1130, 1132, 1134, 1136, 1140, 1142, 1144 and 1146 denote only outputs produced by using a compression technique on the lanes 1100, 1102, 1104, 1106, 1110, 1112, 1114 and 1116, and thus, there is no limitations on the format of information included in each compressed lane. For example, according to the compression technique used for compression, the compressed lane may not include any information, have an increased bit width, have a decrease bit width, have an unchanged bit width, and include the same value as a value of a target lane.

A plurality of compression techniques may compress neural network data by reducing redundancy of neural network data. Neural network data may include a plurality of redundant information. A plurality of compression techniques may reduce the size of neural network data by compressing redundant information included in neural network data by using various techniques.

A plurality of compression techniques may have different compression units used in each compression technique. For example, the compression unit used in each compression technique may be a symbol or a sequence of symbols.

A symbol refers to a unit that is a reference when compression is applied to a compression target. For example, the first lanes 1100 and 1110 to which the first compression technique is applied may use a bit segment in which a bit width of the first lanes 1100 and 1110 is 2 as a symbol, and the second lanes 1102 and 1112 to which the second compression technique is applied may use a bit segment having a bit width of 3 as a symbol.

The sequence of symbols may denote a unit that is a reference when compression is applied to a compression target. The sequence of symbols may denote a sequence in which symbols are arranged over several sequential compression processes. Here, the compression process may denote that compression techniques are applied to one bit representation once. For example, when the first lane 1100 of the first bit representation is input in the first compression process and the first lane 1110 of the second bit representation is input in the second compression process, the first compression technique may use the sequential first lanes 1100 and 1110 as a sequence of symbols.

A plurality of compression techniques may be separately referred according to a compression unit used in each compression technique. A compression technique using symbols may be referred to as a symbol-based compression technique, and a compression technique using a sequence of symbols may be referred to as a sequence-based compression technique.

According to the present example, a symbol-based compression technique and/or a sequence-based compression technique may be used regardless of the characteristics of input neural network data. An optimum compression rate may be achieved by splitting a bit representation of neural network data into lanes and using a symbol-based compression technique and/or a sequence-based compression technique suitable for the characteristics of each lane.

Each of the compression techniques may have a corresponding algorithmic parameter, and a plurality of compression techniques may have algorithmic parameters different from each other. For example, a maximum sequence may be an algorithmic parameter of a run-length coding on zeros (Z-RLC), a size of matrix may be an algorithmic parameter of a compressed sparse column/row (CSC/CSR), and a size of block may be an algorithmic parameter of a dynamic precision reduction (DPRed). However, some compression techniques may not have a corresponding algorithmic parameter. For example, zero-value compression (ZVC) may not have a corresponding algorithmic parameter.

The processor 410 or 510 may concatenate the compressed lanes 1130, 1132, 1134 and 1136 and output the compressed bit representation 113, and concatenate the compressed lanes 1140, 1142, 1144 and 1146 and output the compressed bit representation 114. For example, the processor 410 or 510 may output compressed bit representations 113 and 114.

Meanwhile, it is depicted that, in the compressed bit representations 113 and 114, the compressed lanes 1130, 1132, 1134, 1136, 1140, 1142, 1144 and 1146 are combined in the order of the lanes 1100, 1102, 1104 and 1106, but there is no limit in the order of combining the compressed lanes 1130, 1132, 1134, 1136, 1140, 1142, 1144, and 1146. However, in the following description, for convenience of explanation, it is assumed that the compressed lanes are combined in the order of the lanes.

Figure 12:
FIG. 12 is a table for explaining a plurality of compression techniques according to an example.

FIG. 12 is a table for describing a plurality of compression techniques according to an example.

Referring to FIG. 12, a plurality of compression techniques is shown in table 12 and may include None, ZVC, Run-Length Coding (RLC), Z-RLC, and DPRed.

As described above with reference to FIG. 6, none may denote a compression technique that does not compress lanes. As the lane is not compressed, the compressed lane may have the same value as the lane before compression.

ZVC may not have a corresponding algorithm parameter and may not have a range of values for the algorithm parameter.

An algorithmic parameter corresponding to RLC may be a maximum sequence $2^p$, and a range of the algorithmic parameter may be $1 \leq p \leq 32$.

An algorithmic parameter corresponding to Z-RLC may be a maximum sequence $2^p$, and a range of the algorithmic parameter may be $1 \leq p \leq 32$.

When compressing a lane with DPRed, the processor 410 or 510 may compress the lane by adding one bit to the most significant bit (MSB). DPRed that adds one bit to the MSB may be referred to as Sparse-DPRed (S-DPRed). The added one bit may indicate whether all 0s are allocated to the block to be compressed or not. Since it is possible to indicate whether all 0s are allocated or not, a compression rate of sparse data may be increased.

The processor 410 or 510 may remove a zero-bit mask when compressing a lane with DPRed. DPRed from which the zero-bit mask is removed may be referred to as Dense DPRed (D-DPRed). As the zero-bit mask is removed, the compression rate of dense data may be increased.

An algorithmic parameter corresponding to D-DPRed and S-DPRed may be a block size p, and a range of the algorithmic parameter may be $1 \leq p \leq 8$.

Figure 13:
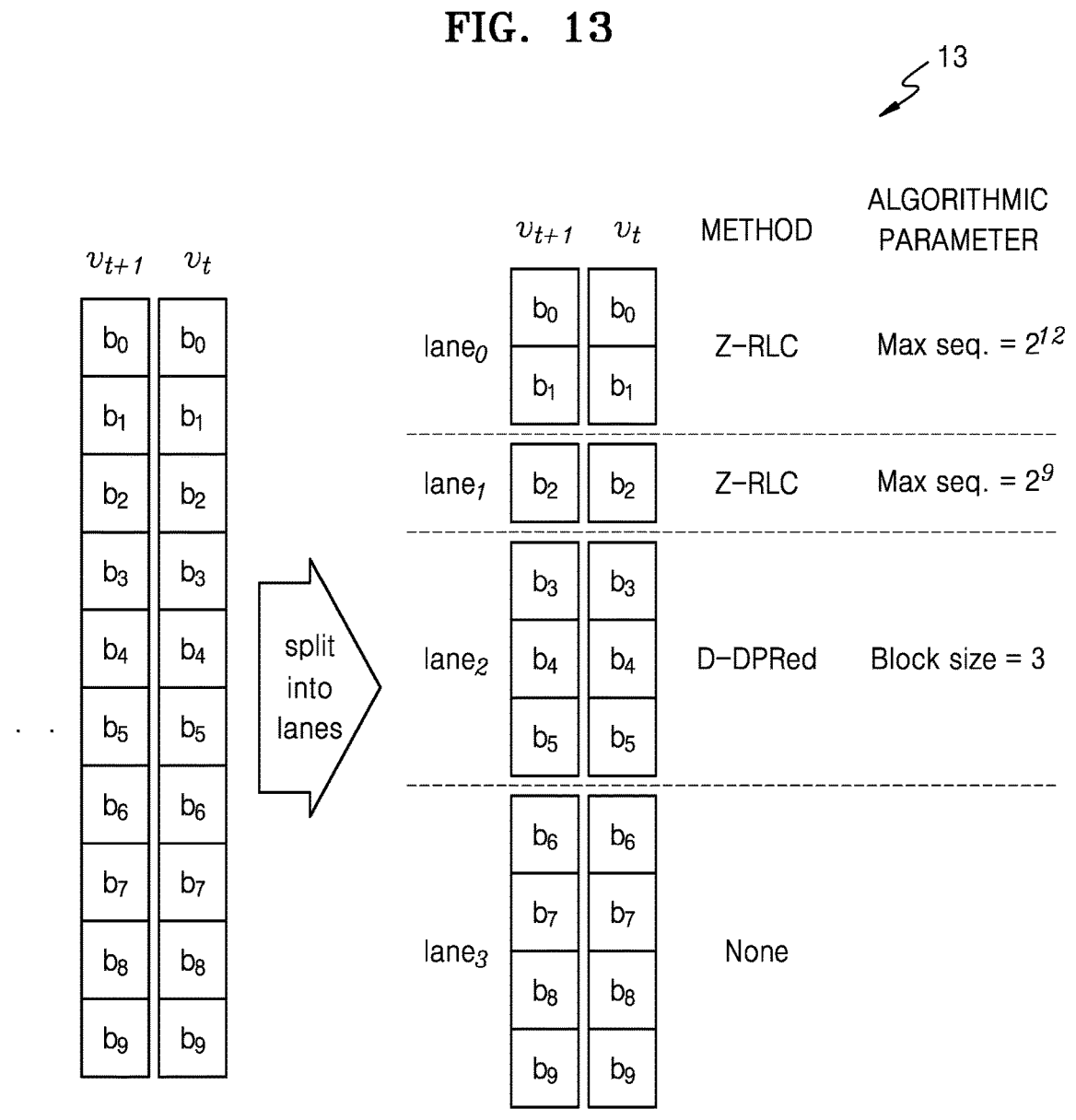

FIG. 13 is a diagram for describing a method 13 of compressing according to an optimal configuration according to an example.

Referring to FIG. 13, the processor 410 or 510 may determine an optimal configuration in which the number of lanes is 4; bit widths of each of the lanes (lane 0, lane 1, lane 2, and lane 3) are 2 bits, 1 bit, 3 bits, and 4 bits, respectively; compression techniques applied to each lane are Z-RLC, Z-RLC, D-DPRed and None; and values of algorithmic parameters applied to each lane are $2^{12}$, $2^9$ and 3.

Meanwhile, the neural network apparatus 5 may compress or decompress neural network data based on an optimal configuration determined in advance through profiling as described above. Hereinafter, a method of compressing or decompressing neural network data will be described with reference to FIGS. 14 to 16.

FIG. 14 is a diagram for describing an encoder 140 according to an example.

Referring to FIG. 14, the encoder 140 may include a first splitter 142, a plurality of compression units 144a, 144b and 144c, and a first concatenator 146. The encoder 140 may be a constituent element corresponding to the encoder 514 described with reference to FIG. 5.

The encoder 140 may split neural network data into a plurality of lanes based on a predetermined optimal configuration, and compress each of the split lanes using an optimal configuration.

The first splitter 142 may obtain an optimal configuration predetermined by a final profile in which compression techniques set for each lane are defined by dividing neural network data into one or more lanes. For example, the first splitter 142 may obtain the optimal configuration from the memory 520 (refer to FIG. 5), and may obtain from the memory 520 via the neural network processing unit 512 (refer to FIG. 5) a control signal generated by the neural network processing unit 512 based on the optimal configuration.

Meanwhile, the method of obtaining the optimum configuration by the first splitter 142 is not limited to the method described above.

The first splitter 142 may obtain bit representations of data used for processing a neural network, and may split the bit representations into one or more lanes by using an optimal configuration.

The first splitter 142 may extract information required for compression techniques used in a plurality of compression units 144a, 144b, and 144c from the bit representations. The extracted information may be transmitted to the compression units 144a, 144b, and 144c that require the extracted information. For example, the first splitter 142 may extract leading zero bits required for a null suppression (NS) technique.

The plurality of compression units 144a, 144b, and 144c may compress each of the split lanes using an optimal configuration and output compressed lanes. For example, the plurality of compression units 144a, 144b, and 144c may compress lanes split by a compression technique applied to each lane in an optimal configuration for each compression unit, and output the compressed lanes. Meanwhile, in FIG. 14, for convenience of explanation, only three compression units 144a, 144b and 144c are shown, but N (N is a natural number) compression units may be included in the encoder 140.

The plurality of compression units 144a, 144b, and 144c may perform a plurality of compression techniques for each compression unit. As each compression unit performs a plurality of compression techniques, each compression unit may perform an appropriate compression technique even when the optimum configuration is changed.

The plurality of compression units 144a, 144b, and 144c may be matched one-to-one with split lanes according to an optimal configuration. For example, the first compression unit 144a is matched one-to-one with Lane 1 and performs a first compression technique, and the second compression unit 144b is matched one-to-one with Lane 2 and performs a second compression technique.

The first concatenator 146 may concatenate the compressed lanes and output compressed bit representations. The first concatenator 146 may concatenate compressed lanes. The compressed lanes concatenated by the first concatenator 146 may be referred to as a concatenated lane. The first concatenator 146 may generate a compressed bit representation 148 based on the concatenated lane and output the compressed bit representation.

The first concatenator 146 may insert a stop code for synchronizing the compressed lanes output from the plurality of compression units 144a, 144b and 144c into the concatenated lanes. For example, the first concatenator 146 may insert a stop code into the concatenated lanes. Lanes sequentially input to the compression unit 144a, which is one of the compression units 144a, 144b, and 144c, may not be output through the compression unit 144a more than a predetermined number of times. When the compression unit 144a outputs a lane compressed again, the first concatenator 146 may insert a stop code into the concatenated lane including the compressed lane output from the compression unit 144a.

The first concatenator 146 may check whether the stop code is inserted or not, and insert a bit value indicating whether the stop code is inserted or not according to the check result. The compressed bit representation 148 may include a code in the same format as the stop code, even though the stop code is not inserted. In this case, ambiguity in the decoder 516 (refer to FIG. 5) may be a problem. As a bit value indicating whether the stop code is inserted or not is inserted into the concatenated lane, the decoder 516 may distinguish the stop code inserted by the first concatenator 146.

For example, the first concatenator 146 may check whether a stop code is inserted or not in the concatenated lane. When it is checked that the stop code is inserted into the concatenated lane, the first concatenator 146 may add a bit value indicating that the stop code is inserted into the concatenated lane. When it is checked that the stop code is not inserted in the concatenated lane, the first concatenator 146 may add a bit value indicating that the stop code is not inserted into the concatenated lane.

The first concatenator 146 may generate a compressed bit representation 148 by inserting a stop code and a bit value indicating whether the stop code is inserted or not into the concatenated lane.

FIG. 15 is a diagram for describing a stop code insertion algorithm 15 according to an example.

Referring to FIG. 15, the stop code insertion algorithm 15 may be used to insert a stop code and a bit value indicating whether the stop code is inserted or not into the concatenated lane, described with reference to FIG. 14.

In operation 151, the first concatenator 146 adds a stop code and a bit value indicating that the stop code is inserted into the concatenated lane in a situation when a stop code is required.

In operation 152, the first concatenator 146 adds a bit value indicating that the stop code is not inserted into the concatenated lane.

For example, a stop code may have a bit width of C, following one bit value of '1', a bit value of '0' of C–1 number of bits may be selected, a bit value indicating that the stop code is inserted in the concatenated lane may be one bit value '0', and a bit value indicating that the stop code is not inserted may be one bit value '1'. The width of the stop code and the bit value indicating whether the stop code is inserted or not are for illustration only, and are not limited to the above description.

FIG. 16 is a diagram for describing compression of an encoder according to an example.

Referring to FIG. 16, table 16 shows a case in which the encoder 140 outputs compressed bit representations in each sequential compression process when bit representations of 5-bits are input to the encoder 140. Here, the stop code is '10', Lane 1 of 2 bits is compressed by ZVC, and Lane 2 of 3 bits is compressed by Z-RLC having a Max seq. of $2^2$. Meanwhile, for convenience of explanation, it is assumed that Lane 1 is compressed by the first compression unit 144a (refer to FIG. 14) and Lane 2 is compressed by the second compression unit 144b (refer to FIG. 14).

In a first compression process 160, the compression unit 144a corresponding to Lane 1 outputs a compressed lane of '0', and the compression unit 144b corresponding to Lane 2 outputs a compressed lane of '00011'. The first concatenator 146 concatenates the compressed lanes and outputs a compressed bit representation of '000011'.

In second to fifth compression processes 161, 162, 163, and 164, the compression unit 144b corresponding to Lane 2 does not output the compressed lane. In sixth compression process 165, the compression unit 144b corresponding to Lane 2 outputs a compressed lane again, and the first concatenator 146 outputs a compressed bit representation of '1000001' by inserting a stop code '10' and a bit value '0' indicating that the stop code is inserted into the concatenated lane '0001'.

In the second compression process 161, the compression unit 144a corresponding to Lane 1 outputs a compressed lane of '101', and the compression unit 144b corresponding to Lane 2 does not output a compressed lane. Here, the compressed lane of '101' includes a stop code that has not inserted. Accordingly, the first concatenator 146 inserts a bit value '1' indicating that a stop code is not inserted into the concatenated lane '101' and outputs a compressed bit representation of '1011'.

In a seventh compression process 166, the compression unit 144a corresponding to Lane 1 outputs a compressed lane of '0', and the compression unit 144b corresponding to Lane 2 outputs a compressed lane of '010'. The first concatenator 146 concatenates the compressed lanes and outputs a compressed bit representation of '0010'.

Figure 17:
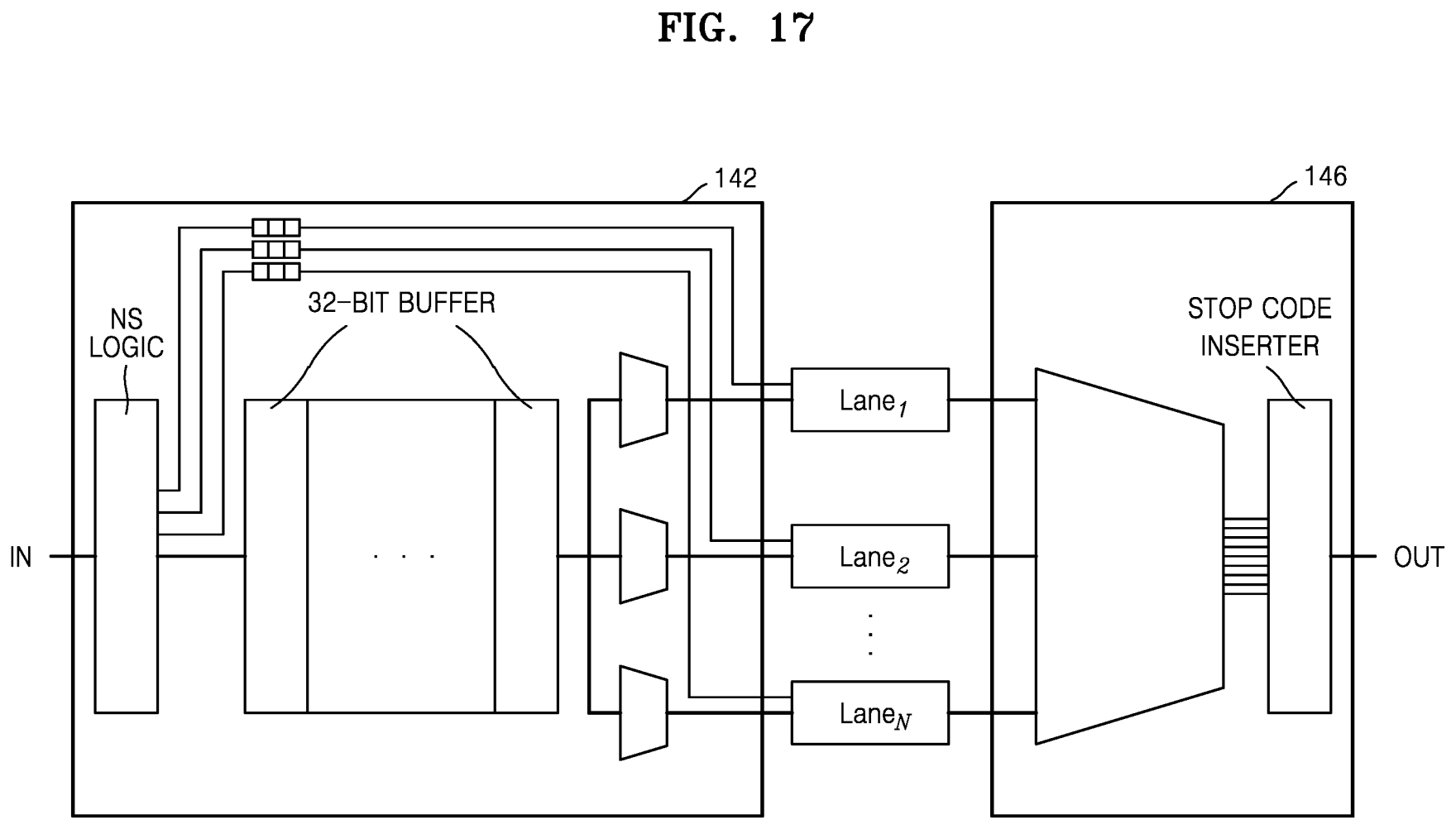

FIG. 17 is a block diagram for describing an encoder according to an example.

Referring to FIG. 17, the first splitter 142 may further include an NS logic and a buffer. The NS logic may extract leading zero bits required for a Null Suppression (NS) technique and transfer the leading zero bits to the plurality of compression units 144a, 144b, and 144c. Bit representations input to the first splitter 142 may be buffered through a buffer.

The first concatenator 146 may further include a Mux and a stop code inserter. The Mux may concatenate compressed lanes, and the stop code insertion unit may insert stop codes into the concatenated lanes.

Figure 18:
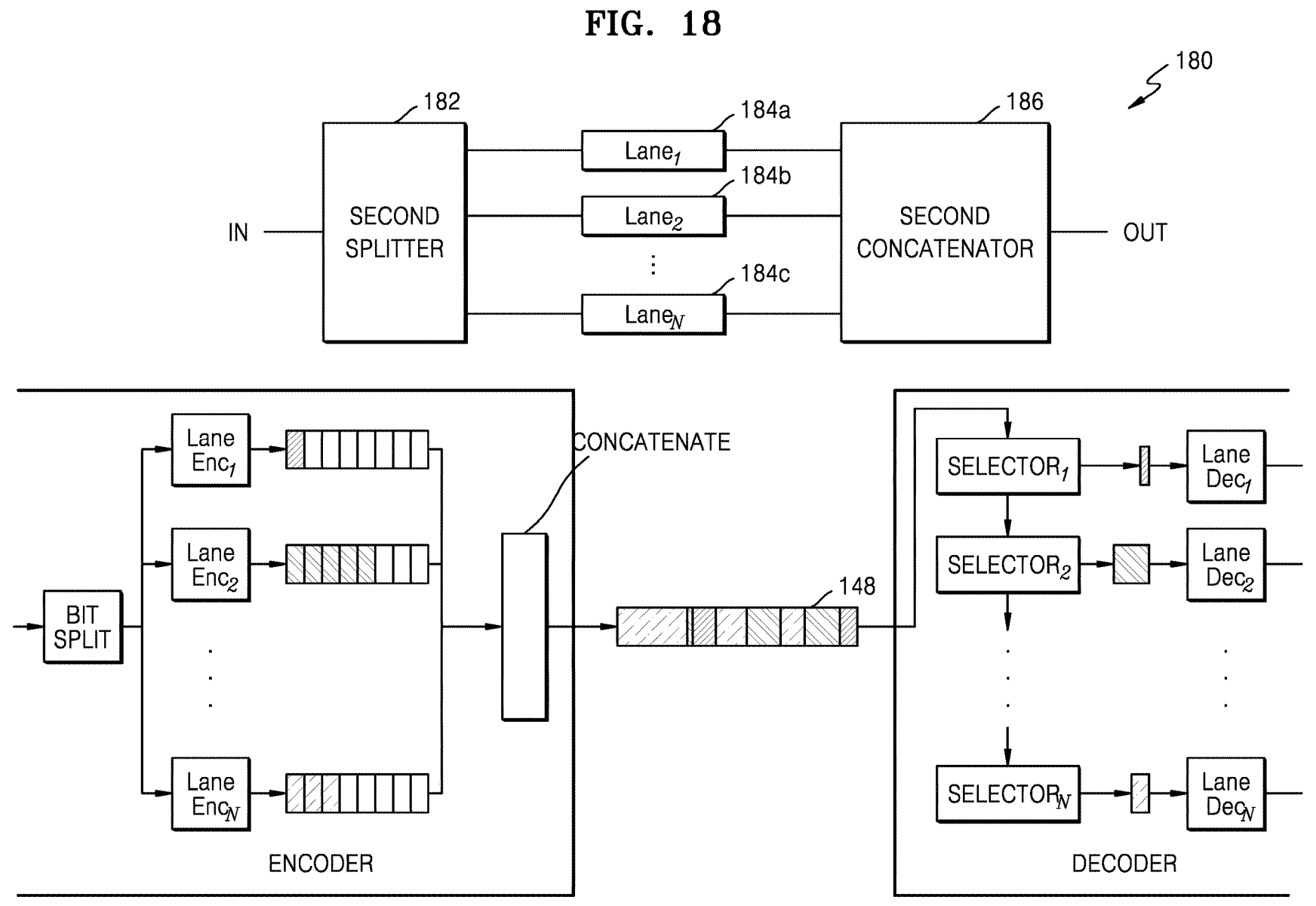

FIG. 18 is a diagram for describing a decoder 180 according to an example.

Referring to FIG. 18, the decoder 180 (which may correspond to the decoder 516 of FIG. 5) includes a second splitter 182, a plurality of decompressors 184a, 184b and 184c, and a second concatenator 186.

The decoder 180 may split compressed data of the neural network into a plurality of compressed lanes based on a predetermined optimal configuration, and decompress the neural network data by performing decompression techniques for each compressed lane. Here, the compressed data may denote data compressed by the encoder 140 described with reference to FIGS. 14 to 17, and the plurality of decompression techniques may denote the technique of decompression of data compressed by the compression techniques described with reference to FIGS. 14 to 17.

The decoder 180 may perform a function of decompression by inversely applying the compression techniques described with reference to FIGS. 14 to 17.

The second splitter 182 may obtain a predetermined optimal configuration to perform compression techniques for each lane by dividing neural network data into one or more lanes.

The second splitter 182 may obtain a compressed bit representation 148 of the compressed data of the neural network, and may split the compressed bit representation 148 into one or more compressed lanes based on the obtained optimal configuration. For example, the second splitter 182 may predict bit widths of the compressed lanes constituting the compressed bit representation 148 based on the optimal configuration, and may split the compressed bit representation 148 into one or more compressed lanes based on the predicted bit widths.

The optimal configuration obtained by the second splitter 182 may be the same optimal configuration used in the encoder 140 (refer to FIG. 14). Accordingly, the second splitter 182 may predict bit widths of compressed lanes constituting the compressed bit representation 148 based on information on how the compressed lanes constituting the compressed bit representation 148 are compressed in the encoder 140.

For example, referring again to FIG. 16, it may be seen that Lane 1 is a lane having a bit width of 2 bits, ZVC is applied to Lane 1, and compressed lanes corresponding to Lane 1 are 1 bit zero-value or a 3-bit non-zero value. Lane 2 is a lane having a bit width of 3 bits, Z-RLC is applied to Lane 1, and compressed lanes corresponding to Lane 1 are 3 bits or 5 bits. In other words, when each lane is compressed according to an optimal configuration, the second splitter 182 may know in advance the number of bit widths that each compressed data may have. The second splitter 182 may split the compressed bit representation 148 into one or more compressed lanes by predicting bit widths of the compressed lanes constituting the compressed bit representation 148 based on the number of bit widths that each compressed data may have.

Meanwhile, a method of predicting the bit widths of the compressed lanes constituting the compressed bit representation 148 by the second splitter 182 is not limited to the above description. The second splitter 182 may predict bit widths of the compressed lanes based on at least one of an order of concatenating compressed lanes constituting the compressed bit representations 148, a stop code included in the compressed bit representation 148, and an operation using a zero-test.

Referring to FIG. 18, the second splitter 182 may check a stop code included in the compressed bit representation 148. The second splitter 182 may check a bit value indicating whether the stop code is inserted or not, and delete the stop code according to the check result.

For example, when it is checked that the stop code is inserted, the second splitter 182 may delete the stop code and the bit value indicating that the stop code is inserted, and when it is checked that the stop code is not inserted, the second splitter 182 may delete only the bit value indicating that the code is not inserted.

The second splitter 182 may transfer the split compressed lanes to decompression units 184a, 184b and 184c. For example, the second splitter 182 may transmit each compressed lane to the decompression unit 184a that performs a decompression technique corresponding to each compressed lane.

The plurality of decompression units 184a, 184b, and 184c may be matched one-to-one with each compressed lane according to an optimal configuration. For example, the first decompression unit 184a may be matched one-to-one with a lane in which Lane 1 is compressed, and perform a first decompression technique, and the second decompression unit 184b may be matched one-to-one with a lane in which Lane 2 is compressed, and perform a second decompression technique.

The plurality of decompression units 184a, 184b, and 184c may decompress each of the split compressed lanes based on an optimum configuration and output the decompressed lanes. The decompressed lanes may be the same as one or more lanes split by the first splitter 142 described above with reference to FIG. 14.

The second concatenator 186 may concatenate the decompressed lanes and output decompressed bit representations. The decompressed bit representations may be the same as those obtained by the first splitter 142 described above with reference to FIG. 14.

Figure 19:
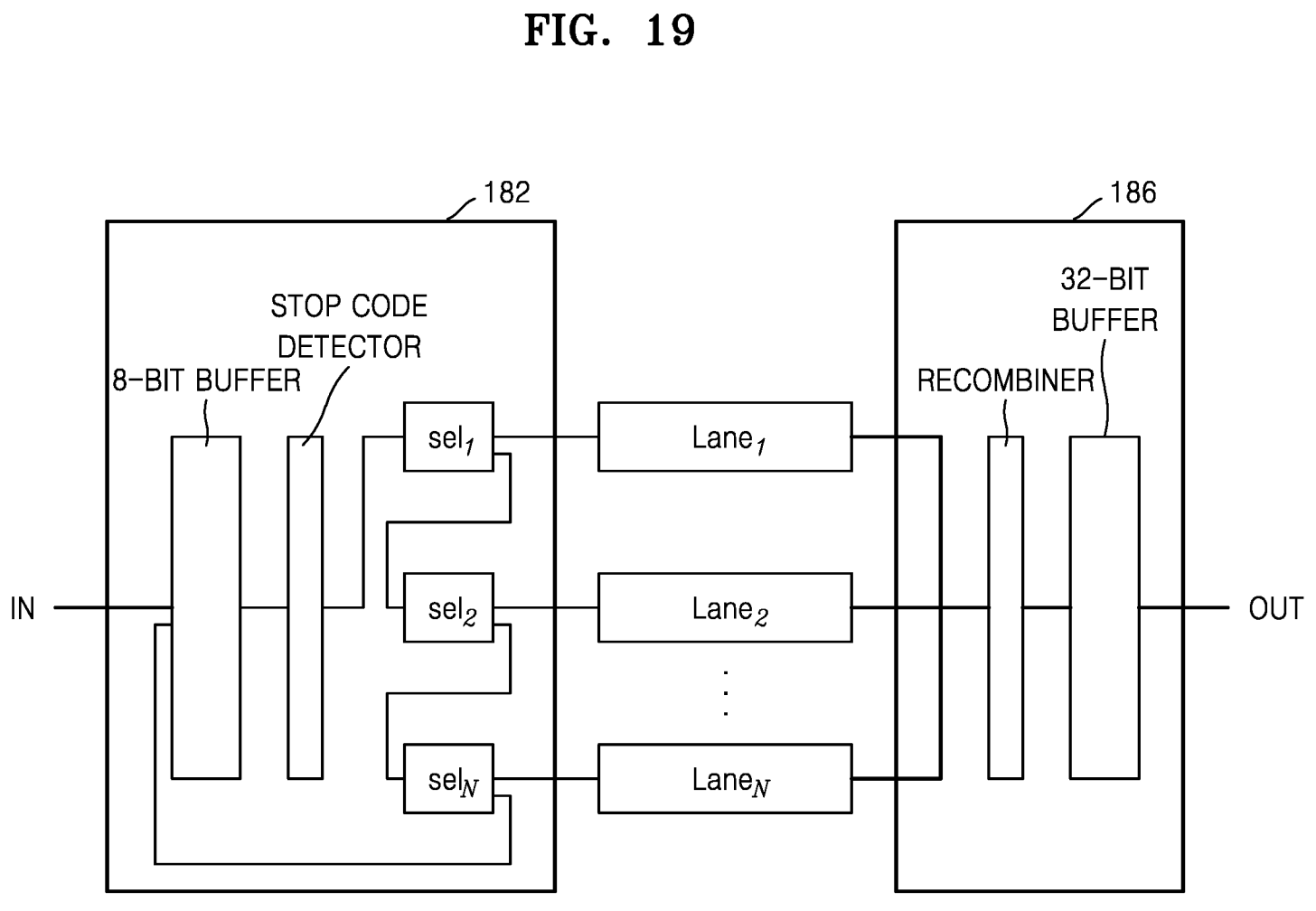

FIG. 19 is a block diagram for describing a decoder according to an example.

Referring to FIG. 19, the second splitter 182 may further include a buffer, a stop code detector, and a plurality of selectors (sel 1, sel 2, and sel N). The stop code detector may detect a stop code included in the compressed bit representation 148. The plurality of selectors sel 1, sel 2, and sel N may sequentially predict a bit width of each of compressed lanes, and split the compressed lane into a plurality of compressed lanes. The second concatenator 186 may further include a recombiner and a buffer.

FIG. 20 is a Table 20 for explaining statistical characteristics of neural network data according to an example.

Referring to FIG. 20, Table 20 shows results of analyzing statistical characteristics of neural network data (activation and weight for inference, and activation, weight, and gradient for re-train) from all layers (convolutional layers, fully connected layers, and auxiliary layers for activation function, normalization, and polling) of 7 different neural networks (LeNet-5, CifarNet1, ResNet-18, SqueezeNet, MobileNet, AlexNet, and LSTM network).

Various neural networks commonly have high sparsity. Redundancy used for compression of neural network data may be sparsity of values and bits. A value sparsity may refer to a ratio of zero-value symbols in a data set, and a bit sparsity may refer to a ratio of zero bits in a binary representation.

Referring to Table 20, many neural network data sources not only have a high value-level sparsity, but also neural network data with a low value-level sparsity have a high bit-level of sparsity. For example, a weight for inferring LeNet-5 has a low value-level sparsity of 3.23%, but has a high bit-level sparsity of 64.32%.

In this way, all hidden bit-level sparsity may be exposed by splitting different neural network data into bit segments or lanes.

Accordingly, the compression method according to the examples may be generally applied to various neural network data regardless of the type of neural network, layer type, learning model, and type of input data.

Figure 21:
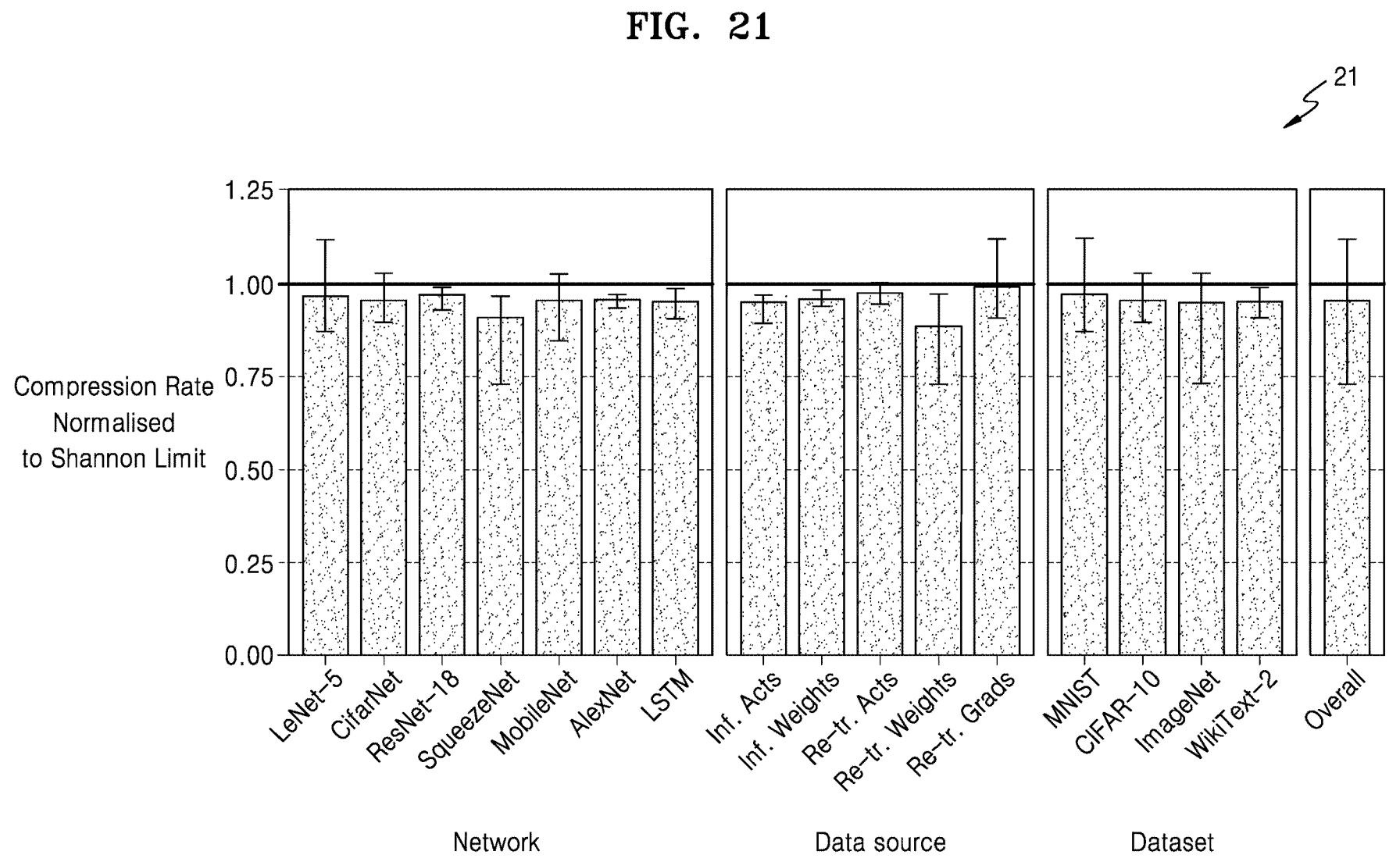

FIG. 21 is a graph 21 for comparing compression rates according to an example.

Referring to FIG. 21, compression rates of a network, a data source, and an input data set compressed by the compression method according to the examples may be compared with a Shannon limit. Each bar shown in the graph 21 represents an average of compression rates for each network, data source, and input data set, and error bars represent minimum and maximum values. Referring to the graph 21, it may be seen that various data may be compressed close to the Shannon limit by using the compression method according to the examples.

Figure 22:
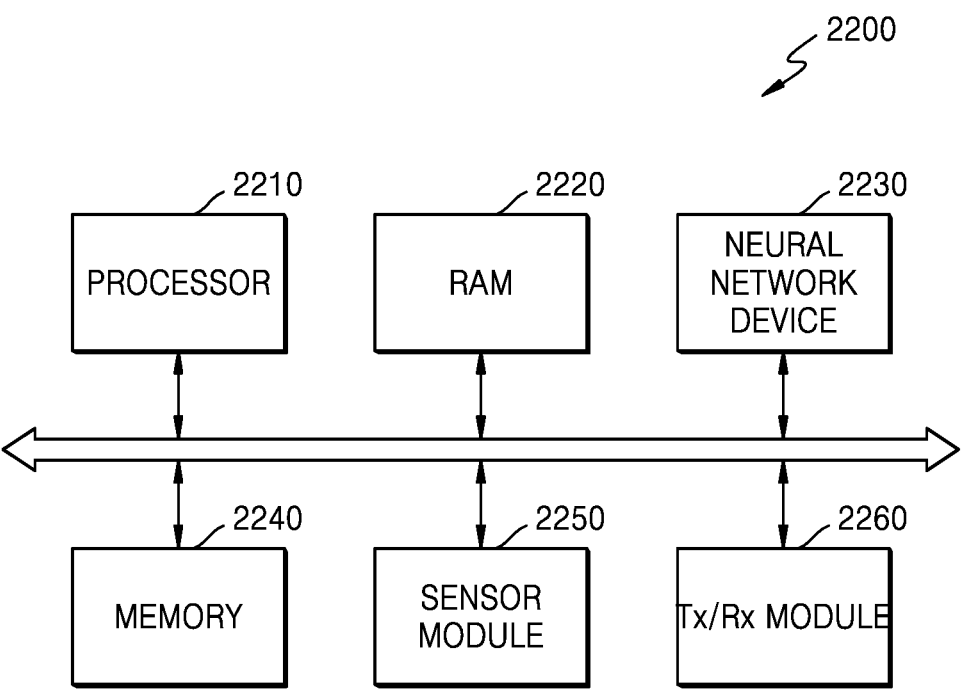
FIG. 22 is a block diagram illustrating a configuration of an electronic system according to an example.

FIG. 22 is a block diagram illustrating a configuration of an electronic system 2200 according to an example.

Referring to FIG. 22, the electronic system 2200 may extract valid information by analyzing input data in real time based on a neural network and determine a situation or control the configuration of a device on which the electronic system 2200 is mounted based on the extracted information. For example, the electronic system 2200 may be applied to a robotic device, such as a drone or an advanced driver assistance system (ADAS), a smart TV, a smart phone, a medical device, a mobile device, an image display device, a measurement device, an IoT device and may be mounted on at least one of various types of electronic devices.

The electronic system 2200 may include a processor 2210, a RAM 2220, a neural network device 2230, a memory 2240, a sensor module 2250, and a communication module 2260. The electronic system 2200 may further include an input/output module, a security module, and a power control device. Some of hardware components of the electronic system 2200 may be mounted on at least one semiconductor chip.

The processor 2210 controls an overall operation of the electronic system 2200. The processor 2210 may include a single processor core (Single Core), or a plurality of processor cores (Multi-Core). The processor 2210 may process or execute programs and/or data stored in the memory 2240. In some embodiments, the processor 2210 may control functions of the neural network device 2230 by executing programs stored in the memory 2240. The processor 2210 may be implemented by a CPU, GPU, AP, etc.

The RAM 2220 may temporarily store programs, data, or instructions. For example, programs and/or data stored in the memory 2240 may be temporarily stored in the RAM 2220 according to the control or booting code of the processor 2210. The RAM 2220 may be implemented as a memory, such as dynamic RAM (DRAM) or static RAM (SRAM).

The neural network device 2230 may perform an operation of the neural network based on received input data and generate an information signal based on the execution result. Neural networks may include convolution neural networks (CNN), recurrent neural networks (RNN), feedforward Neural Network (FNN), deep belief networks, restricted Boltzmann machines, etc., but are not limited thereto. The neural network device 2230 may be a hardware accelerator itself dedicated to a neural network or an apparatus including the same. The neural network device 2230 may perform a read or write operation as well as an operation of a neural network.

The neural network device 2230 may perform an operation of a neural network based on received input data, and may generate an information signal based on the operation result. Neural networks may include CNN, RNN, deep belief networks, restricted Boltzmann machines, etc., but are not limited thereto. The neural network device 2230 is hardware that processes the neural network data described above, and may correspond to a hardware accelerator dedicated to the neural network described above. The information signal may include one of various types of recognition signals, such as a voice recognition signal, an object recognition signal, an image recognition signal, and a biometric information recognition signal. For example, the neural network device 2230 may receive frame data included in a video stream as input data and generate, on the basis of the frame data, a recognition signal with respect to an object included in an image displayed by the frame data. However, the present inventive concept is not limited thereto, and the neural network device 2230 may receive various types of input data according to the type or function of an electronic device on which the electronic system 2200 is mounted and generate a recognition signal according to the input data.

The memory 2240 is a storage for storing data and may store an operating system (OS), various programs, and various data. In an embodiment, the memory 2240 may store intermediate results generated in a process of performing an operation of the neural network device 2230.

The memory 2240 may be DRAM, but is not limited thereto. The memory 2240 may include at least one of volatile memory and nonvolatile memory. The non-volatile memory includes ROM, PROM, EPROM, EEPROM, flash memory, PRAM, MRAM, RRAM, FRAM, etc. The volatile memory includes DRAM, SRAM, SDRAM, PRAM, MRAM, RRAM, FeRAM, etc. In an embodiment, the memory 1240 may include at least one of HDD, SSD, CF, SD, Micro-SD, Mini-SD, xD and Memory Stick.

The sensor module 2250 may collect information around an electronic device on which the electronic system 2200 is mounted. The sensor module 2250 may sense or receive a signal (e.g., an image signal, a voice signal, a magnetic signal, a bio signal, a touch signal, etc.) from the outside of the electronic device and convert the sensed or received signal into data. To this end, the sensor module 2250 may include at least one of various types of sensing devices, for example, a microphone, an imaging device, an image sensor, a light detection and ranging (LiDAR) sensor, an ultrasonic sensor, an infrared sensor, a bio sensor, and a touch sensor, etc.

The sensor module 2250 may provide converted data as input data to the neural network device 2230. For example, the sensor module 2250 may include an image sensor, generate a video stream by photographing an external environment of the electronic device, and sequentially provide successive data frames of the video stream to the neural network device 2230 as input data. However, the configuration is not limited thereto, and the sensor module 2250 may provide various types of data to the neural network device 2230.

The communication module 2260 may include various wired or wireless interfaces capable of communicating with external devices. For example, the communication module 2260 may include a local area network (LAN), a wireless local area network (WLAN), such as Wi-Fi, a wireless personal area network (WPAN), such as Bluetooth, a wireless universal serial bus (USB), ZigBee, near-field communication (NFC), radio-frequency identification (RFID), power-line communication (PLC), or a communication interface capable of connecting to a mobile cellular network, such as 3rd generation (3G), 4th generation (4G), long-term evolution (LTE), or 5th generation (5G).

FIG. 23 is a flowchart of a method of processing data of a neural network in a neural network apparatus according to an example. The method of processing data of a neural network shown in FIG. 23 is related to the examples described with reference to the drawings described above, and thus, the descriptions given with respect to the preceding drawings, even though omitted below, may be applied to the method of FIG. 23.

In operation 2310, the processor 410 may obtain one or more bit representations of data used for processing a neural network.

In operation 2320, the processor 410 may generate a plurality of candidate profiles by dividing one or more bit representations of the obtained data into one or more lanes and applying compression techniques to each lane.

In operation 2330, the processor 410 may determine a final profile by comparing compression performances for each of the candidate profiles.

In operation 2340, the processor 410 may determine one or more divided lanes and compression techniques used in the determined final profile as an optimal configuration for compressing data of the neural network.

Examples of the inventive concept may be implemented as a computer-readable program, and may be realized in general computers that execute the program by using non-transitory computer-readable recording media. In addition, the structure of data used in the examples of the inventive concept may be recorded on a non-transitory computer-readable recording medium through various means. The non-transitory computer-readable medium may be magnetic storage media (e.g., ROM, floppy disks, hard disks, etc.) and optical recording media (e.g., CD-ROMs or DVDs).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing data of a neural network, comprising:
obtaining one or more bit representations of data;
generating a plurality of candidate profiles, each candidate profile including information of splitting methods and information of compression techniques including compression pipeline configuration, wherein the one or more of the bit representations are to be split, using the splitting methods, into one or more lanes, respectively, and the compression pipeline configuration including a lossy transform stage and a lossless compression stage is applied to each of the lanes;

determining a compression performance for each of the plurality of candidate profiles, wherein the compression performance comprises:
calculating, for each candidate profile, a composite compression rate defined as a product of a compression rate of the lossy transform stage and a compression rate of the lossless compression stage;
determining a time complexity of each candidate profile; and
determining a size of a required memory space of each candidate profile;
determining, by comparing a respective result of the compression performance of each of the candidate profiles, a final profile from among the plurality of candidate profiles, wherein the final profile is a candidate profile having the greatest compression rate among the calculated compression rates among the plurality of candidate profiles;
determining, from the determined final profile, splitting methods and compression techniques for one or more lanes as an optimal configuration for compressing data of the neural network, including skipping compression of a lane including a least significant bit (LSB) dependent on the determined final profile, and
compressing the data of the neural network according to the determined optimal configuration by splitting the bit representations into the one or more lanes and compressing each lane using the compression techniques defined by the optimal configuration,
wherein the candidate profiles comprise profiles to which the splitting methods, in which the number of lanes for dividing the bit representations into a plurality of bit segments and bit widths of the bit segments corresponding to each of the lanes are differently set from each other, are applied.

2. The method of claim 1, wherein generating the plurality of candidate profiles comprises:
generating the candidate profiles by differently applying at least one of the splitting methods for splitting the bit representations into the one or more lanes and the compression techniques.

3. The method of claim 2, wherein the candidate profiles comprise profiles having sparsity distributions of the lanes different from each other according to the number and bit width of the lanes.

4. The method of claim 2, wherein the candidate profiles comprise profiles to which compression techniques different from each other are applied for each of the lanes.

5. The method of claim 1, wherein the candidate profiles comprise profiles to which compression techniques having algorithmic parameters different from each other are applied.

6. The method of claim 1, wherein the data of the neural network comprise at least one of activations, weights, and gradients of the neural network.

7. The method of claim 1, wherein the candidate profiles comprise a profile to which a compression technique that does not compress the lane including the least significant bit (LSB) among the lanes is applied.

8. A computer-readable non-transitory recording medium recording a program for executing the method of claim 1 on a computer.

9. An apparatus for processing data of a neural network, comprising:
a memory configured to store at least one program; and
a processor configured to compress the data by executing the at least one program, wherein the processor:

obtains one or more bit representations of data used for processing the neural network;

generates a plurality of candidate profiles, each candidate profile including information of splitting methods and information of compression techniques including compression pipeline configuration, wherein the one or more of the bit representations are to be split, using the splitting methods, into one or more lanes, respectively, and the compression pipeline configuration, including a lossy transform stage and a lossless compression stage, is applied to each of the lanes;

determines a compression performance for each of the plurality of candidate profiles, wherein the compression performance comprises:

calculating, for each candidate profile, a composite compression rate defined as a product of a compression rate of the lossy transform stage and a compression rate of the lossless compression stage;

determining a time complexity of each candidate profile; and determining a size of a required memory space of each candidate profile;

determines, by comparing a respective result of the compression performance of each of the candidate profiles, a final profile from among the plurality of candidate profiles, wherein the final profile is a candidate profile having the greatest compression rate among the calculated compression rates;

determines, from the determined final profile, splitting methods and compression techniques for one or more lanes as an optimal configuration for compressing data of the neural network, including skipping compression of a lane including a least significant bit (LSB) dependent on the determined final profile; and compresses the data of the neural network according to the determined optimal configuration by splitting the one or more bit representations into the one or more lanes and compressing each lane using the compression techniques defined by the optimal configuration, wherein the processor generates the splitting methods in which the number of lanes for dividing the bit representations into a plurality of bit segments and bit widths of the bit segments corresponding to each of the lanes are differently set from each other, are applied.

10. The apparatus of claim 9, wherein the processor generates the candidate profiles by differently applying at least one of the splitting methods for splitting the bit representations into the one or more lanes and the compression techniques.

11. An apparatus for processing data of a neural network comprising:

one or more processors including:

a splitter configured to obtain an optimal configuration predetermined by a final profile in which compression techniques set for each lane are defined by splitting, using a splitting method included in the final profile, the data of the neural network into one or more lanes, to obtain bit representations of data used for processing the neural network, and to split the bit representations into the one or more lanes by using a splitting method of the optimal configuration, wherein the final profile is determined from among a plurality of candidate profiles based on a compression performance for each of the candidate profiles, wherein the compression performance comprises:

a composite compression rate defined as a product of a compression rate of a lossy transform stage and a compression rate of a lossless compression stage of a compression pipeline configuration;

a time complexity of each candidate profile; and a size of a required memory space of each candidate profile, wherein the final profile is a candidate profile having the greatest compression rate among the compression rates, and wherein the compression techniques include the compression pipeline configuration including the lossy transform stage and the lossless compression stage;

a plurality of compressors configured to compress the data of the neural network by compressing each of the split lanes using the compression techniques defined by the optimal configuration and output the compressed lanes, including skipping compression of a lane including a least significant bit (LSB) dependent on the optimal configuration predetermined by the final profile; and a concatenator configured to concatenate the compressed lanes and output compressed bit representations, wherein the candidate profiles comprise profiles to which the splitting methods, in which the number of lanes for dividing the bit representations into a plurality of bit segments and bit widths of the bit segments corresponding to each of the lanes are differently set from each other, are applied.

12. The apparatus of claim 11, wherein the plurality of compressors is configured to compress the split lanes using a compression technique applied to each lane in the optimal configuration in each compressor.

13. The apparatus of claim 11, wherein the concatenator is configured to insert a stop code for synchronizing the compressed lanes output from the plurality of compressors.

14. The apparatus of claim 13, wherein the concatenator is configured to check whether the stop code is inserted, and to insert a bit value indicating whether the stop code is inserted according to the check result.

15. An apparatus for processing data of a neural network comprising:

one or more processors including:

a splitter configured to obtain an optimal configuration predetermined by a final profile in which compression techniques set for each lane are defined by splitting, using a splitting method included in the final profile, the data of the neural network into one or more lanes, obtain compressed bit representations of compressed data of the neural network including skipping compression of a lane including a least significant bit (LSB) dependent on the optimal configuration predetermined by the final profile, and split the compressed bit representations into one or more compressed lanes based on a splitting method of the optimal configuration, wherein the final profile is determined from among a plurality of candidate profiles based on a compression performance for each of the candidate profiles, wherein the compression performance comprises:

a composite compression rate defined as a product of a compression rate of a lossy transform stage and a compression rate of a lossless compression stage of a compression pipeline configuration;

a time complexity of each candidate profile; and a size of a required memory space of each candidate profile, wherein the final profile is a candidate profile having the greatest compression rate among the compression rates, and wherein the compression techniques include the compression pipeline configuration including the lossy transform stage and the lossless compression stage;

a plurality of decompressors configured to decompress the data of the neural network by decompressing each of the split compressed lanes based on the optimal configuration and output the decompressed lanes;

a concatenator configured to concatenate the decompressed lanes and output the decompressed bit representations, wherein the candidate profiles comprise profiles to which the splitting methods, in which the number of lanes for dividing the bit representations into a plurality of bit segments and bit widths of the bit segments corresponding to each of the lanes are differently set from each other, are applied.

16. The apparatus of claim 15, wherein the splitter is configured to predict bit widths of the compressed lanes constituting each of the compressed bit representations based on the optimal configuration, and to split the compressed bit representations into one or more compressed lanes based on the predicted bit widths.

17. The apparatus of claim 16, wherein the splitter is configured to check a stop code included in the compressed bit representations.

18. The apparatus of claim 17, wherein the splitter is configured to check a bit value indicating whether the stop code is inserted, and to delete the stop code according to a check result.

\*   \*   \*   \*   \*